United States Patent [19]

Tanaka et al.

[11] Patent Number: 5,355,475
[45] Date of Patent: Oct. 11, 1994

[54] METHOD OF RELOCATING FILE AND SYSTEM THEREFOR

[75] Inventors: Kazuaki Tanaka; Akihiko Togawa, both of Yokohama; Taro Inoue, Sagamihara, all of Japan

[73] Assignee: Hitachi, Ltd., Tokyo, Japan

[21] Appl. No.: 782,076

[22] Filed: Oct. 24, 1991

[30] Foreign Application Priority Data

Oct. 30, 1990 [JP] Japan .................. 2-292656

[51] Int. Cl.$^5$ ............................................ G06F 15/40
[52] U.S. Cl. ......................... 395/600; 364/DIG. 1; 364/282.1; 364/283.1; 364/281; 364/262.4; 364/245; 364/245.2
[58] Field of Search ............... 395/425, 650, 700, 400, 395/155, 156, 159, 600

[56] References Cited

U.S. PATENT DOCUMENTS

| | | | |
|---|---|---|---|
| 4,601,003 | 7/1986 | Yoneyama et al. | 364/518 |
| 4,642,790 | 2/1987 | Minshull et al. | 364/200 |
| 4,888,681 | 12/1989 | Barnes et al. | 364/200 |
| 4,993,030 | 2/1991 | Krakauer et al. | 371/40.1 |
| 5,065,347 | 11/1991 | Pajak et al. | 395/159 |
| 5,131,087 | 7/1992 | Warr | 395/425 |

FOREIGN PATENT DOCUMENTS 63-80344 9/1986 Japan .................... G06F 12/00

Primary Examiner—Kevin A. Kriess
Attorney, Agent, or Firm—Fay, Sharpe, Beall, Fagan, Minnich & McKee

[57] ABSTRACT

In a computer system which includes storage units of a hierarchy structure, a method of relocating a file stored in a source storage unit includes the steps of determining an access indicator indicative of the efficiency of access to the file in response to a relocation instruction, determining a relocating destination storage unit of the file in the storage hierarchy, and relocating the file in the determined destination storage unit.

18 Claims, 22 Drawing Sheets

FIG. 1B

| 13 | JOB NAME | EXPECTING EXECUTION TIME | MEAN EXECUTION TIME | EXECUTION COUNT | NAME OF ACCESSED FILE | PRESET ACCESS COUNT | MEAN ACCESS COUNT | ACTUAL RESPONSE TIME | | EXECUTION CAPABILITY BIAS FACTOR |
|---|---|---|---|---|---|---|---|---|---|---|
| | 13A | 13B | 13C | 13D | 13E | 13F | 13G | 13H | | 13I |

FIG. 1C

| 15 | NAME OF FILE | FILE CAPACITY | NAME OF POOL | NAME OF FILE-ALLOCATED STORAGE UNIT | RELOCATION INDICATOR | NAME OF FILE-RELOCATED STORAGE UNIT | ACCESS FREQUENCY | ACTUAL RESPONSE TIME |
|---|---|---|---|---|---|---|---|---|
| | 15A | 15B | 15C | 15D | 15E | 15F | 135A | 165A |

FIG. 1D

| 17 | NAME OF POOL | NAME OF STORAGE UNIT | AMOUNT OF SPACE | AMOUNT OF EMPTY SPACE | AMOUNT OF RESERVED SPACE | MEAN RESPONSE TIME | CRITICAL BUSY RATIO | ESTIMATED BUSY RATIO |
|---|---|---|---|---|---|---|---|---|
| | 17A | 17B | 17C | 17D | 17E | 17F | 17G | 17H |

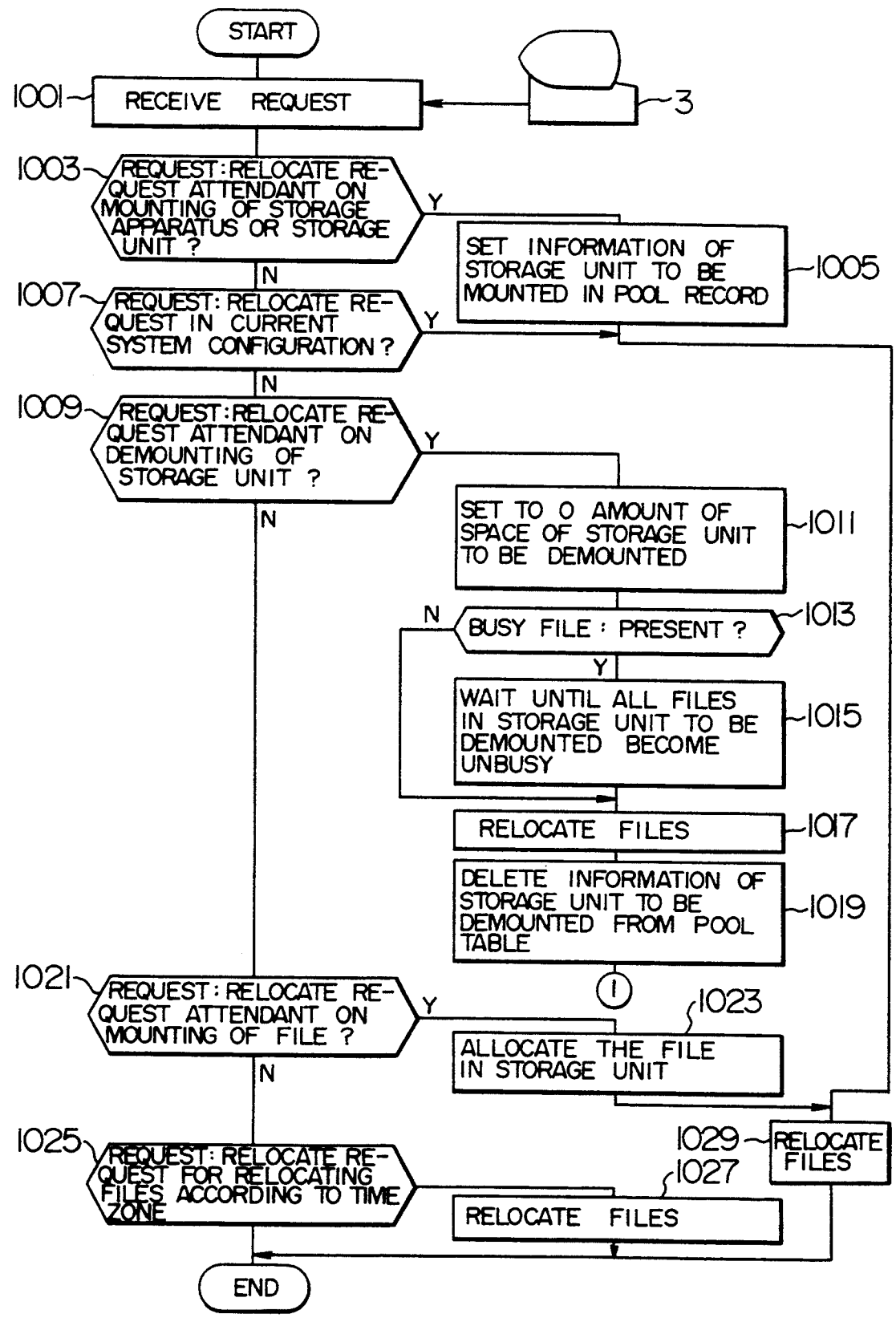

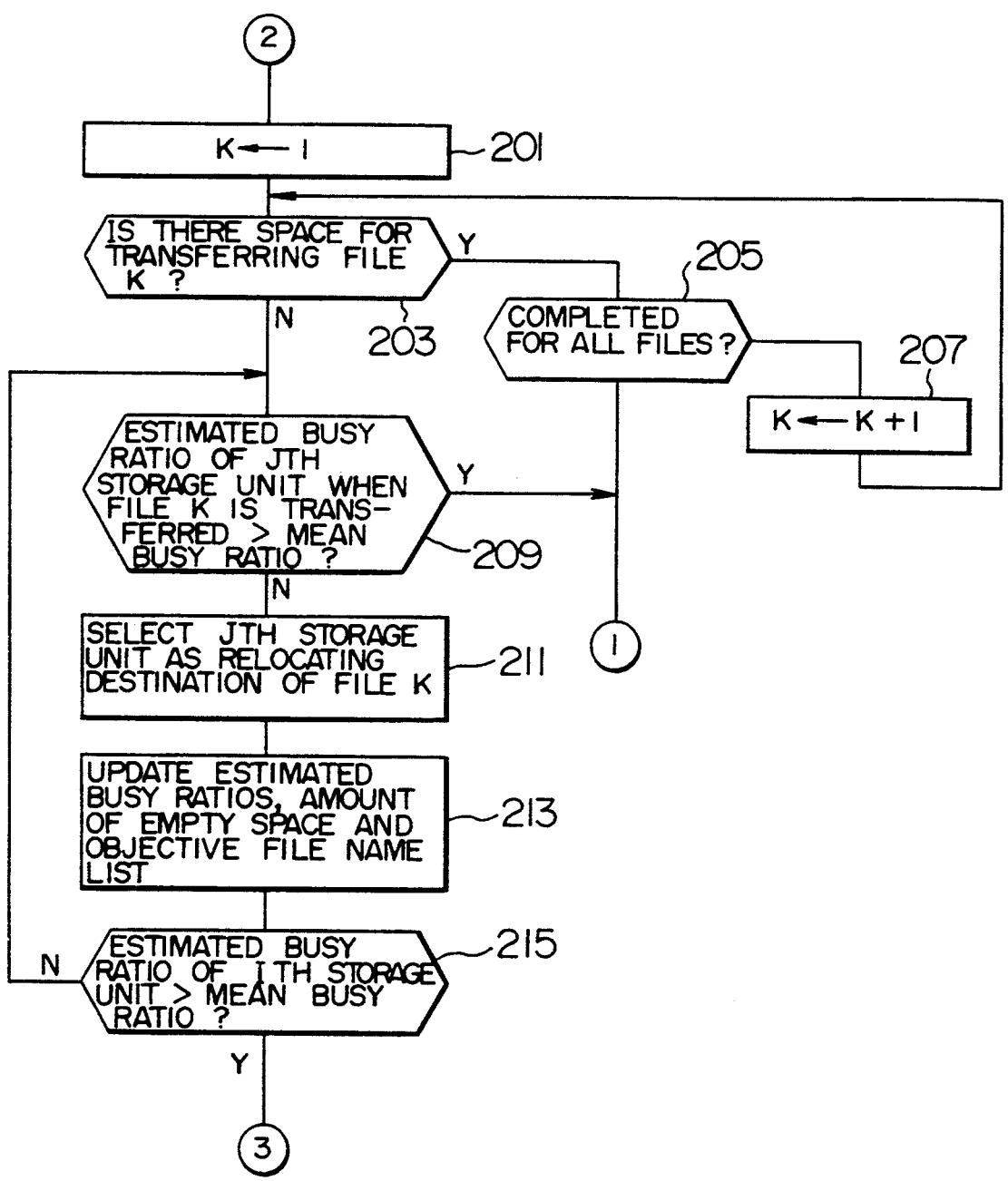
F I G. 8B

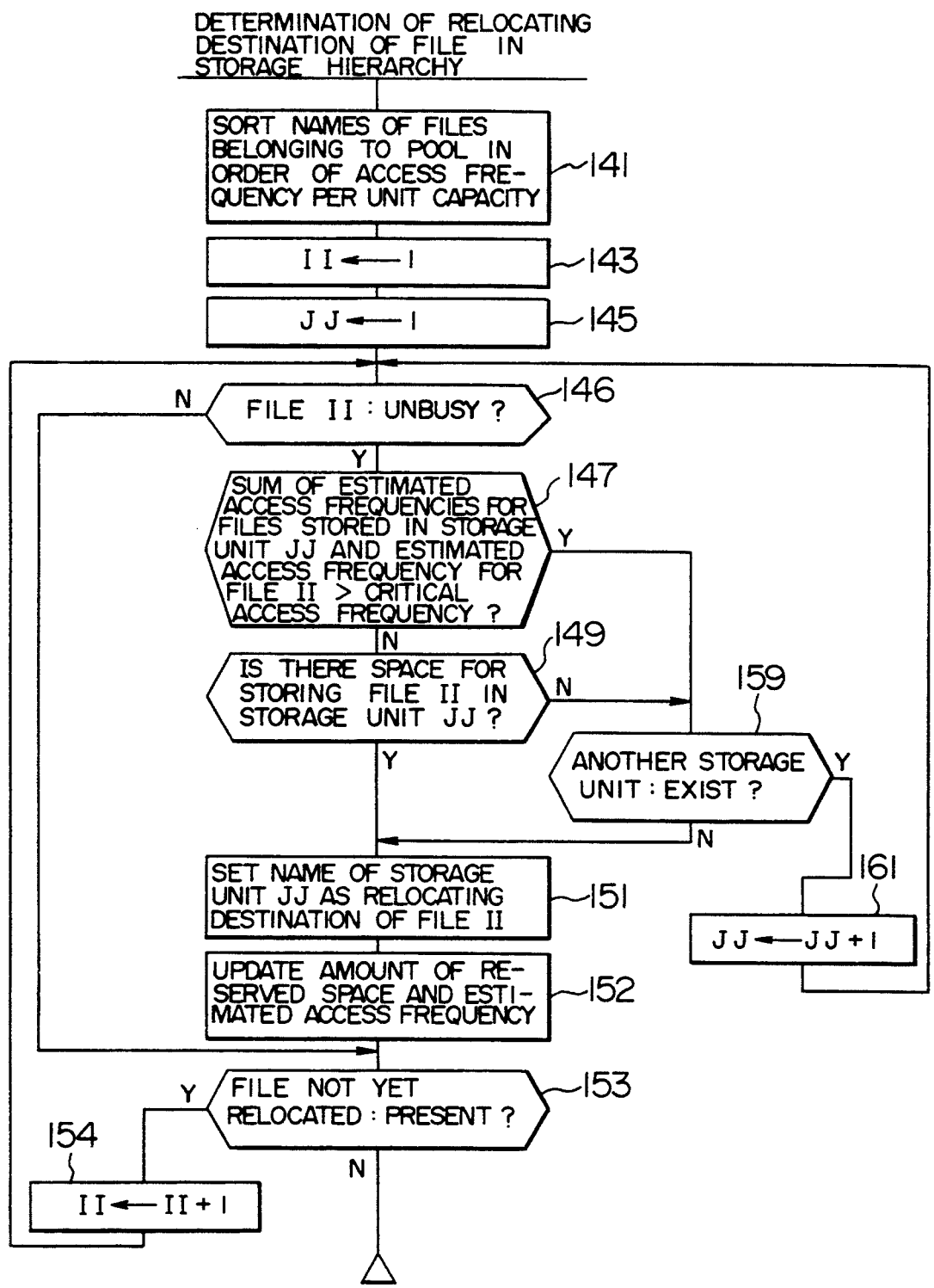

F I G. 16
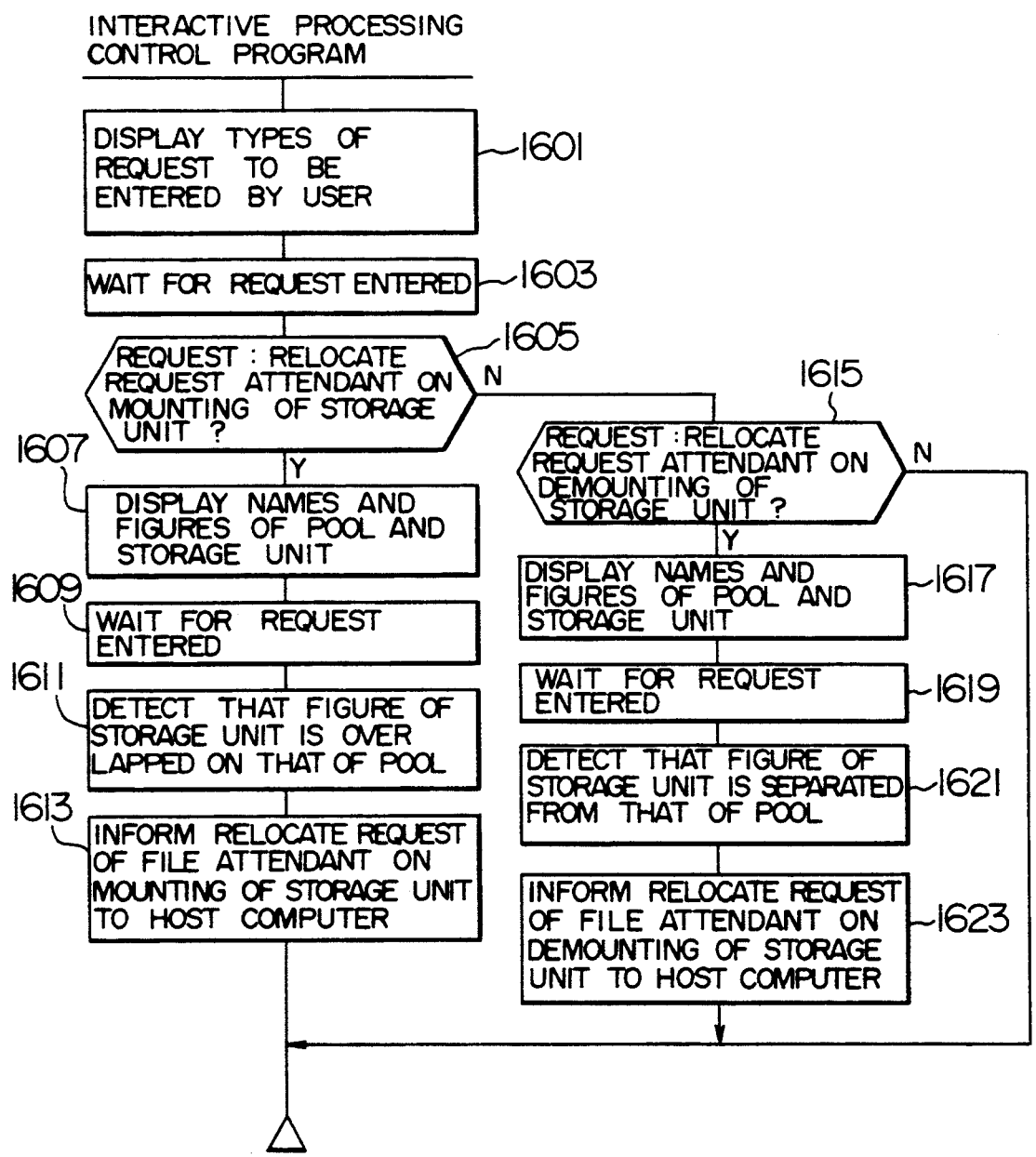

F I G. 18
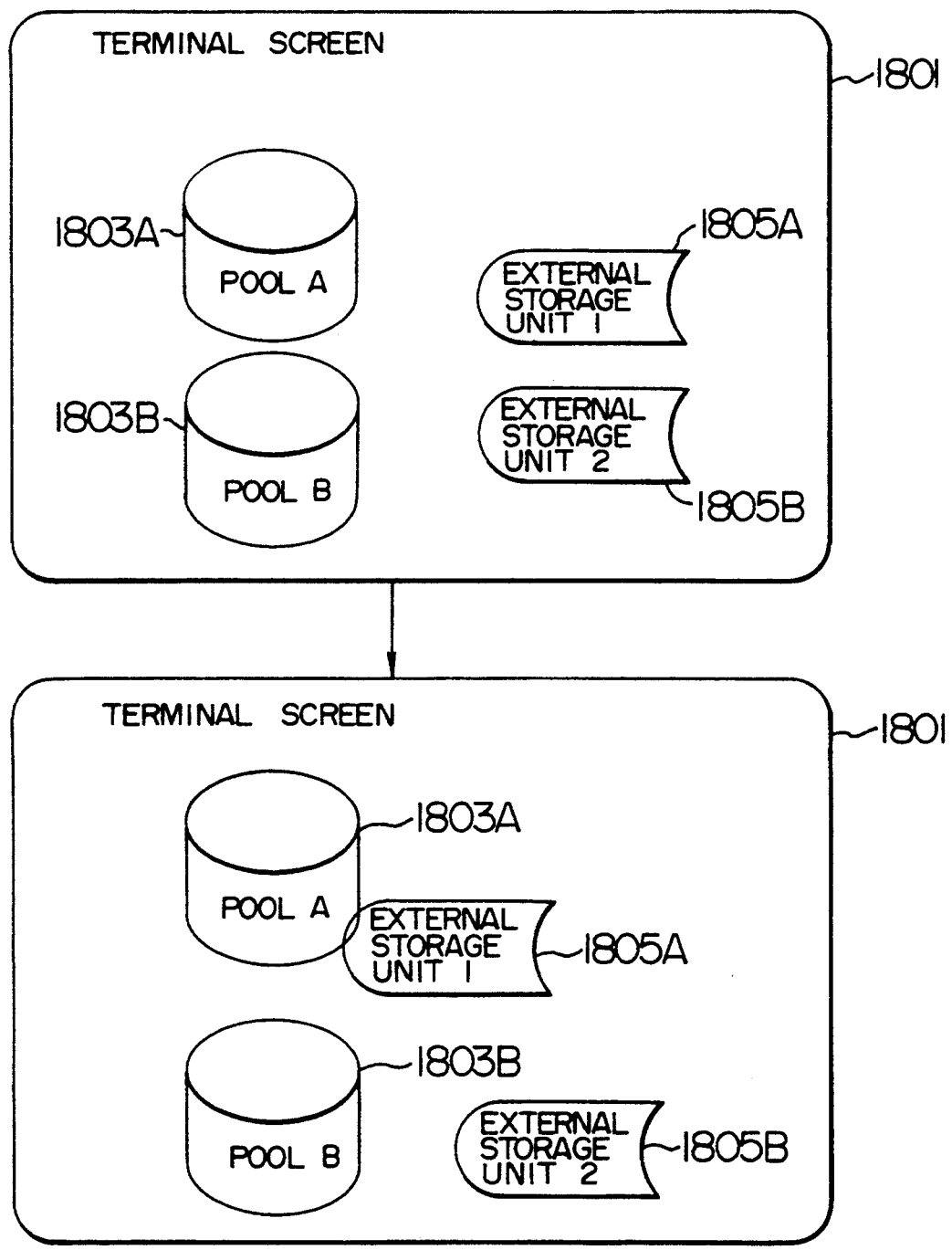

METHOD OF RELOCATING FILE AND SYSTEM THEREFOR

BACKGROUND OF THE INVENTION

1. Field of the Invention

The present invention relates to a method of relocating a plurality of files respectively with a different access frequency stored in a plurality of external storage units having different capacities and speeds with one another.

2. Description of Related Art

There are presently available a variety of storage units, for example an extended storage unit, a semiconductor disc, a magnetic disc, an optical disc library and an MT library. In the written order, these storage units operate at higher speeds but have less capacities and are more expensive.

For configuring a computer system, all or a part of the above-mentioned storage units are combined and hierarchically arranged in accordance with the access speed. When such a system is actually operated, it is necessary to relocate files frequently among different storage units from a viewpoint of utilizing efficiency.

In a conventional file relocating method, for example, as described in JP-A-63-80344, files are relocated in external storage units having higher access speeds in the descending order in which the files are more frequently subjected to physical input and output accesses. More specifically, data indicating the frequency of physical input and output accesses is stored in a table by a monitor program, and the data in this table is sorted in the descending order of the physical input and output frequencies. In accordance with the sorting result, files most frequently accessed for physical input and output are copied and relocated in faster external storage units. On the other hand, files with less physical input and output frequencies are copied and relocated in slower external storage units. This relocation technique results in an extreme reduction of human manipulation and a rapid and precise relocation of files in external storage units, thereby resulting in improving the access efficiency of the files.

Conventional file relocating methods including the above described one, however, may imply the following problems.

(i) Attention is hardly given to an execution time of a job expected by a user, so that a problem arises when a high speed execution is desired to a job which less frequently accesses files physically.

(ii) Attention is hardly given to a time necessary for a relocation of files and concentration of accesses to a particular external storage unit due to the relocation. For this reason, problems are encountered when files must be relocated in destination storage units within a limited time and when a particular external storage unit is highly frequently accessed to frequently cause a storage unit waiting time.

(iii) The file capacity is not considered. For example, a highly frequently accessed file requiring a large capacity is dedicatedly allocated in a storage unit having a relatively small capacity and high speed only by reason of its being highly frequent accessed, whereas, a group of files frequently accessed next to the above-mentioned file but each requiring far smaller capacities than the same are allocated in a low speed and large capacity storage unit, thereby causing a problem that a file access efficiency of the whole system is degraded.

(iv) A determination basis for determining relocating destination storage units of files in a storage hierarchy constituted by a plurality of kinds of storage units which respectively have different access capabilities is not distinguished from a determination basis for determining relocating destination storage units so as to balance access loads to the respective storage units among a plurality of storage units having the identical access capability.

SUMMARY OF THE INVENTION

It is an object of the present invention to provide a file relocating method and a system therefor which can solve the above-mentioned conventional problems, relocate files within a relocation allowable time so as to satisfy an execution time expected by a user, determine file relocating destinations among storage units having different access capabilities in the descending order of the file access frequencies not only per unit time but also per unit file capacity, and determine relocating destinations so as to balance access loads of respective storage units among storage units having the identical access capability.

It is another object of the present invention to provide a file relocating method and a system therefor which can automatically relocate files in the storage apparatus group according to a basis for determining relocating destinations of files, and automatically generate job execution parameters used therefor, when a storage apparatus is mounted on a storage apparatus group composed of a plurality of storage units and a certain storage apparatus is demounted therefrom.

It is a further object of the present invention to provide a method and a system which only transfers file management information as for files, data of which need not be actually transferred, and reserve a region for the data of the files, thereby enabling a rapid relocation of files.

It is a further object of the present invention to provide a file relocating method and a system therefor in which is provided an operating procedure by which a user can readily inform a computer system of a file relocation caused by mounting of a new storage apparatus on and demounting of a storage apparatus from a storage apparatus group.

In order to achieve the objects, in computer system including storage units of a hierarchy structure, a method of relocating a file stored in a source storage unit, includes the steps of:

determining an access indicator indicative of the efficiency of access to the file in response to a relocation instruction;

determining a destination storage unit in the storage hierarchy to which the file is to be relocated in accordance with the determined access indicator; and relocating the file in the determined destination storage unit.

According to the present invention as described above, files are transferred such that the difference between an expecting execution time designated by a user and an actual execution time is minimized in a job or job net unit, thereby making it possible to minimize an access frequency of a storage unit in a predetermined extent. Also, files are allocated in faster storage units in the descending order of file access frequencies per unit time as well as per unit file capacity in a predetermined extent. Therefore, file relocation destinations can be determined among storage units having different access capabilities. Further, file relocation destinations can be determined so as to balance access loads among storage units having the identical access capability. Furthermore, attendant on mounting of a new storage unit to and demounting a storage unit from a storage unit group, relocation of files stored in the storage unit group is automatically executed, or job execution parameters therefor only are automatically generated. The present invention can accomplish the file relocation at a higher speed based on attributes of files which only need transfer of file management information and reservation of a file region and do not require data transfer. Also, an operating procedure is provided which allows a user to readily inform a computer system of a file relocation attendant on mounting of a new storage unit to and demounting a storage unit from a storage unit group.

BRIEF DESCRIPTION OF THE DRAWINGS

FIG. 1B is a diagram illustrating in detail a structure of a job record shown in FIG. 1A;

FIG. 1C is a diagram illustrating in detail a structure of a file record shown in FIG. 1A;

FIG. 1D is a diagram illustrating in detail a structure of a pool record shown in FIG. 1A;

FIG. 2 is a flowchart used for explaining the processing based on a file allocating program shown in FIG. 1A;

FIGS. 8A and 8B are flowcharts used for explaining in detail the processing for determining a relocating destination of a file among apparatus of the identical type;

FIG. 12 is a flowchart used for explaining in detail the processing for determining a relocating destination of a file in a storage hierarchy shown in FIG. 11;

FIG. 16 is a flowchart used for explaining the processing of an interactive processing control program employed in the work station of FIG. 15;

FIG. 18 is a diagram illustrating figures representing pools and storage units displayed on a screen of a terminal for mounting a storage unit in a pool;

DESCRIPTION OF THE PREFERRED EMBODIMENTS

Figure 1A:
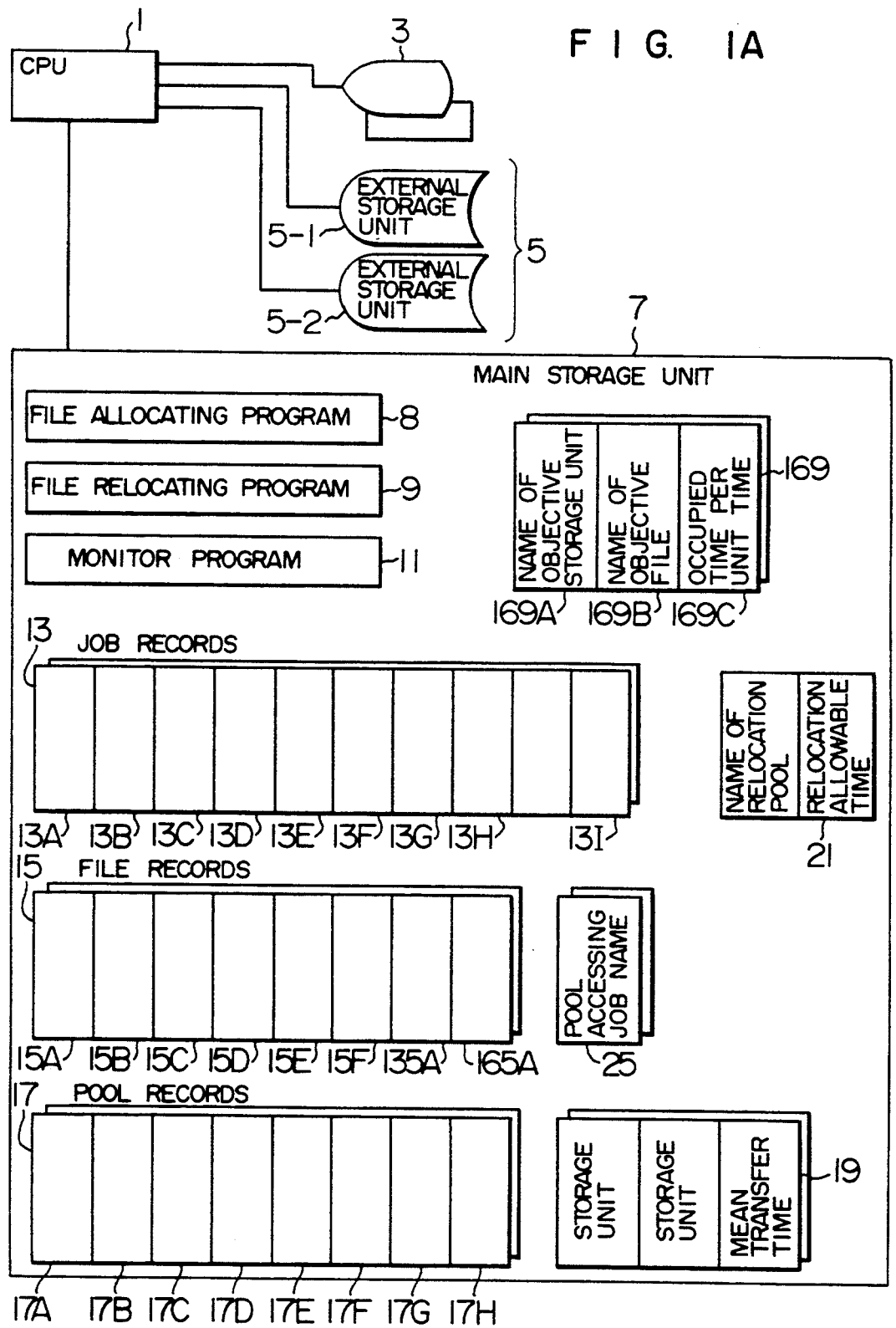
FIG. 1A is a block diagram illustrating the configuration of a file relocating system according to a first embodiment of the present invention.

A file relocating system of the present invention will hereinbelow be described with reference to accompanying drawings.

Prior to a description on embodiments of the file relocating system of the invention, a concept of the invention will first be explained.

In the file relocation of the present invention, the execution count of a job is stored, an indicator for each file is calculated in terms of a value calculated by subtracting an expecting execution time from an actual execution time with an execution count and a preset access count of the job being as parameters, and a relocating destination of the file is determined, according to the file indicator, in a storage hierarchy including a plurality of storage units having different access capabilities. Among storage units having the identical access capability, a relocating destination of a file is determined so as to make constant the access frequencies of files allocated in the respective storage units among the respective storage units. Also, for determining a relocating destination of a file, names of respective groups, each of which includes at least one or more storage units, and names of storage units constituting respective groups are managed, and in response to a file relocation request designating a group name, files allocated in storage units in a group designated by the request only are specified and relocated. Also, for determining a relocating destination, the relocating destination is determined for only closed files.

For determining a relocating destination of a file among storage units having different access capabilities, an expecting execution time designated by a user is compared with an actually required execution time for each job or each job net which is executed in the form of a combination of plural jobs. If the comparison result shows that the actual execution time is longer than the expecting execution time, the file is transferred to a group including storage units with access capabilities which may minimize the difference between the expecting and actual execution times. In the comparison of an expecting execution time with an actual execution time, names of groups each including at least one or more storage units and names of storage units which constitute the respective groups are managed, and in response to a file relocation request, a comparison is limitatively made for an accessed portion of files allocated in one of the storage units belonging to a group. Further, for determining a relocating destination of a file, an allowable execution time available for a relocation and a data transfer time between respective storage units are stored, and a file is relocated from a storage unit in which the file is currently allocated to a storage unit as the relocating destination such that a data transfer time is limited within the allowable execution time. Also, for determining relocating destinations of files, a critical access frequency per unit time of a storage unit is stored, and relocating destinations of files are determined such that the sum of estimated access frequencies of files to be relocated in the storage unit does not exceed the critical access frequency. If the relocating destinations of files cannot be determined within the critical access frequency, a message is outputted for recommending extension of an apparatus.

For relocating files in a storage hierarchy including a plurality of storage units having different access capabilities, a unit capacity and an access frequency per unit time of each file and access capability of each storage unit are stored. A file with a large access frequency is relocated in a storage unit having high speed access capability. When management information of a file only is to be transferred without movement of data stored therein, an attribute of such a file, data of which does not have to be transferred, is stored. The data included in the file is prevented from being transferred on the basis of the file attribute upon relocating files. Also, an attribute of a file, for which transfer of management information thereof and a reservation of a file region are necessary but transfer of data thereof is not necessary, is stored such that the data in such a file is prevented from being transferred on the basis of the file attribute upon relocating files.

For determining relocating destinations of files, names of groups each including at least one or more storage units and identifiers for specifying storage units constituting respective groups are managed. When a storage unit is newly mounted in a group, a part of files which have been allocated and stored in either of storage units belonging to the group is selected and transferred to the newly mounted storage unit in response to the mounting of the storage unit. Also, names of groups each including at least one or more storage units and names of storage units constituting respective groups are managed. When at least one storage unit is removed from a group, files allocated in the file to be removed are automatically relocated to other storage units in a group which are not demounted, corresponding to the demounting of the storage unit.

When a storage unit is to be newly mounted, at least a figure representing a group including a name thereof and a figure representing a storage unit also including a name thereof are displayed on a screen of a display unit such that the two figures are not initially overlapped with each other. In response to a manipulation for overlapping the two figures, a part of files in the group is selected and transferred to the storage unit to be mounted. On the contrary, when at least one storage unit is to be demounted from a group, at least a figure representing the group including a name thereof and a figure representing the storage unit as a constituent of the group also including a name thereof are displayed on a screen of a display unit in a manner that the two figures are at least partially overlapped. In this situation, in response to a manipulation for separating the figure representing the storage unit from the figure representing the group, files stored in the storage unit to be demounted are transferred to other storage units of the group.

In the present invention, an expecting execution time set by a user and estimated access counts of respective files are stored for each job, and an actual execution time required to execute a job and access counts of respective files are monitored. If an actual execution time estimated only in consideration of accesses to files allocated in an objective storage unit exceeds the expecting execution time, the files are transferred to a faster storage unit. Stated another way, files are relocated in the storage hierarchy such that an estimated execution time for a job is limited within an expecting execution time. Further, a file relocation is performed in a manner that the sum of the products of access frequencies of respective files allocated in each storage unit and response times is constant among storage units having the identical access capability.

It is thus possible to automatically relocate files among storage units having different access capabilities such that a computer system completes a work processing within a processing time expected by a user. Therefore, storage units can be utilized in accordance with an expectation of a user to the work. Also, since access loads charged to storage units having the identical access capability are balanced, an execution waiting state due to concentration of accesses to a particular storage unit is prevented, thereby improving the utilizing efficiency of the storage units.

In the present invention, the following processing is executed:

① An expecting execution time, an actual execution time, an execution count, a name of an accessed file, a count of estimated accesses to the file, an actually accessed average access count, and an actual response time are stored for each job. The response time generally refers to a total time necessary to an access to a file including a data transfer time, a read/write time, a waiting time, a program processing time, and so on.

② For each file, a file capacity, a name of a storage unit in which each file is allocated, a name of a belonging pool for specifying a storage unit group to which the storage unit belongs are stored.

③ For each pool, names of storage units belonging to each pool, a total space area, a free space area, an average response time, a critical access busy ratio are stored.

④ A relocation request from a user including the specification of a pool name and a relocation allowable time is inputted.

⑤ An expected execution time set for each job is corrected using a ratio of the product of an estimated access count and an average response time for all files to that for a file allocated in an objective storage unit. Similarly, an actual execution time required to each job is corrected in accordance with a ratio of the product of actual access count and an actual response time for all the files to that for the files allocated in the objective storage unit. For each of files which presents the latter larger than the former, the products of at least a difference value therebetween, a job execution count and an estimated access count are totalized, and the totalized result serves as a relocation indicator for each file. Specifically, as the difference between an expecting execution time and an actual execution time of a job is larger, the relocation indicator of a file is larger, so that the file is relocated in a faster storage unit.

⑥ From the file having the largest relocation indicator, files are allocated in faster storage units in the descending order of the relocation indicator, in a manner that a space capacity and an estimated access busy ratio of each storage unit are within respective allowable ranges.

⑦ The above-mentioned step ⑥ is repetitively executed until the relocation indicators of all files allocated in an objective storage unit become zero or an execution time for processing a relocation exceeds an allowable time.

⑧ In each storage hierarchy having the identical access capabilities, relocating destinations are rearranged in a manner that estimated access frequencies of respective storage units belonging to the hierarchy are averaged.

⑨ If an estimated busy ratio does not fall under an allowable range even after a relocation, a message for recommending extension of a storage unit is outputted.

⑩ Files to be relocated, if they exist, are automatically relocated. In addition, for an expecting execution time set by a user and an actual execution time of a group of sequentially executed jobs or a job net, a time portion required to accesses to files allocated in an objective storage unit is obtained. As a result, if the corrected actual execution time exceeds the expecting execution time set by the user, the relocation indicators are calculated for the respective files, where the indicators each include the difference between an expecting execution time and an actual execution time as an element of an execution capability bias factor thereof, in a manner similar to the foregoing step ①. The files are then relocated based on the relocation indicators. It is therefore possible to utilize storage units in accordance with an execution time expected for processing a work composed of a collection of jobs.

Further, based on an access frequency per unit capacity of 0 each file, a highly frequently accessed file is allocated to a faster storage unit to the extent that the busy ratio of the file-allocated storage unit is allowed. It is therefore possible to improve the utilizing degree of high speed storage units. Based on attributes of files for which transfer of file management information and reservation of file regions are necessary and transfer of data stored therein is not necessary, the relocation of files is controlled, thereby reducing a time required to execute the relocation.

Further, on a display unit of an interactive apparatus for communicating with a user, figures representing a storage unit group including at least one or more storage units and a storage unit to be mounted are separately displayed, and in response to a manipulation for overlapping the two figures, files currently stored in either of the storage units in the existing group is automatically relocated to the mounted storage unit. Contrarily, figures representing a storage unit group and a storage unit to be demounted, overlapped with each other, are displayed, and in response to a manipulation for separating the two figures, files stored in the storage unit to be demounted are automatically relocated in other storage units belonging to the storage unit group, thereby alleviating a file transfer operation due to a modification in the apparatus configuration.

The file relocating system of the present invention will hereinbelow be described in detail with reference to the accompanying drawings.

FIGS. 1A to 1D are block diagrams illustrating the file relocating system according to a first embodiment of the present invention. In this embodiment, for relocating file groups allocated in a plurality of storage units respectively having different access capabilities, an expecting access count designated by a user and an estimated access count of each file are stored for each job, and an actual execution time and an actual access count of each file, required to execute each job, are monitored. If the actual execution time converted to an estimated access count is longer than the actual execution time, files are transferred or relocated to a faster storage unit so as to limit the estimated execution time of a job within the expecting execution time. The files are thereby automatically relocated among storage units of different access capabilities in accordance with an execution time expected to the job, thus making it possible to utilize the storage units satisfying the user's expectation.

In FIG. 1A, reference numeral 1 designates a central processing unit (CPU), 3 a terminal unit provided for a user to input a file relocation request, 5 a group of external storage units 5-1, 5-2 in which files are allocated. The group 5 may be comprised of storage units of the identical type or different types. Reference numeral 7 designates a main storage unit, 8 a file allocating program, 9 a file relocating program and 11 a monitor program.

Reference numeral 13 designates a job record, a detail of which is shown in FIG. 1B. Each record includes a job name 13A, an expecting execution time 13B designated by a user, an actual mean execution time 13C actually required to once execute the job, an execution count 13D of the job, a name 13E of a file accessed by the job, a mean access count 13G at which the file has actually been accessed by the job, an actual response time 13H indicative of an average response time per access to a file in the execution of the job, and 13I an execution capability bias factor. The record 13 is generated for each job. The data 13E, 13F, 13G, 13H are set for each file accessed by the job. Incidentally, the response time refers to a total time necessary to an access to a file including a data transfer time, a read/write time, a waiting time, a program processing time, and so on.

Next, reference numeral 15 designates a file record, a detail of which is shown in FIG. 1C. The record 15 includes a name 15A of a file, a file capacity 15B, a name 15C of a pool, a name 15D of a file-allocated storage unit, a relocation indicator 15E, a name 15F of file-relocated storage unit, an access frequency 135A, and an actual response time 165A indicative of an average time actually required to access the file. The file record 15 is generated for each file. When a file is allocated in a plurality of storage units, the number of data 15D equal to that of the storage units are generated.

Next, reference numeral 17 designates a pool record, a detail of which is shown in FIG. 1D. The record 17 includes a name 17A of a pool, a name 17B of a storage unit, an amount 17C of all space available on the storage unit, an amount 17D of an empty space, an amount 17E of a reserved space, a mean response time 17F, a critical busy ratio 17G, and an estimated busy ratio 17H of the storage unit. This record is generated for each pool. When a pool is constituted of a plurality of storage units, data 17B, 17C, 17D, 17E, 17F, 17G, 17H, 165A are set for each of the storage units included in the pool. The mean response time 17F in the record 17 may be set in combination of a direct access response time and a sequential access response time. In the job record, the estimated access count 13F and a means access count 13G may be set for each of file access methods executed by the job. The file relocating program 9 can be executed to properly use several mean access times. In the following explanation, the mean access time is used for simplicity. Alternatively, the mean response time 17F may be used in place of the actual response time 165A.

Turning back to FIG. 1A, reference numeral 19 designates a data field for storing data relative to a mean transfer time between storage units which specifically includes data designating the storage units 5-1, 5-2 and a mean transfer time per unit data amount between these two storage units. There are reserved a number of data fields equal to the number of combinations of storage units.

Reference numeral 21 designates a data field for setting a relocation pool name and a relocation allowable time inputted by a user, and 25 a pool access job name list for setting names of jobs which access the relocation pool.

Reference numeral 169 designates a list of names of objective files to be relocated which includes names 169A, 169B of a storage unit and an objective file belonging to a relocation pool and an occupied time per unit time 169C during which a storage unit is occupied for accessing the file. There are reserved a number of the objective file name field 169B and the occupied time field 169C equal to the number of objective files allocated in the concerned storage unit.

Incidentally, it is supposed in the present embodiment that a plurality of storage units are collected in the form of a pool and file relocation is executed for files belonging to the pool. Even if the file relocation is executed for files allocated in storage units comprised in a whole computer system without taking into account the concept of the pool, the essence of the present invention will not be changed. In the following explanation, the file relocation is supposed to be executed on the basis of the pool.

The job name 13A, the expecting execution time 13B, the file name 13E, the estimated access count 13F, the bias factor 13I, the file name 15A, the pool name 15C, the pool name 17A, the storage unit name 17B, the amount 17C of space, the mean response time 17F, the critical busy ratio 17G, and the mean transfer time 19 are previously set by a user.

Also, the mean execution time 13C, the execution count 13D, the mean access count 13G, the actual response time 13H, the file capacity 15B, the amount 17D of empty space, and the actual response time 165A are set by the monitor program 11. Note, however, that these data may be set by a user in place of the monitor program 11.

The other values are set by the file relocating program 9.

In the block diagram of FIG. 1A, an input/output field for communicating data with respective files and a work area necessary to execute a program are omitted for avoiding complexity.

FIG. 2 is a flowchart showing the processing executed by the file allocating program 8.

As shown in FIG. 2, first, a file relocate request is inputted by a user through the terminal 3 (step 1001).

Next, it is determined whether or not the request has issued due to mounting storage apparatus (step 1003). The storage apparatus includes not only a storage unit but also other apparatus, for example, a channel unit. This is because, even if there is no change in the number of storage units, mounting of the channel unit can solve a problem that a processing speed is restricted due to a lack of channel units. However, it is supposed in the following explanation that the storage apparatus only refers to the storage unit for simplicity. If the answer at step 1003 is YES (Y), information on a storage unit to be mounted, for example, attribute information relative to a pool such as the name 17A of the pool to which the storage unit to be mounted will belong and the amount 17C of all space available in the pool are set in the pool record 17 (step 1005), and then the relocating program 9 is started (step 1029). Thereafter, the processing of FIG. 2 is terminated.

On the contrary, if the determination at step 1003 results in NO (N), it is determined whether or not the request has issued for relocating files without modifying the current system configuration (step 1007). If the answer at step 1007 is Y, step 1029 is executed to relocate files, followed by the termination of the processing.

If N is determined at step 1007, it is determined whether or not the request has been issued attendant on demounting of a storage unit from the current system configuration (step 1009). If the answer at step 1009 is Y, the amount 17C of all space available in the storage unit to be demounted is set to zero (step 1011), and thereafter it is determined whether or not busy files are present in the storage unit to be demounted (step 1013). If there are no busy files present, a processing from step 1017 is executed. Contrarily, if busy files are present, after all files in the storage unit to be demounted have been made unused (step 1015), the relocating program 9 is started to relocate these files. Then, information on the storage unit to be demounted is deleted from the record 17 (step 1019), and the processing is terminated.

On the other hand, if it is determined at step 1009 that the request is not attendant on demounting of a storage unit, it is determined whether or not the file relocate request is attendant on adding a file (step 1021). If the answer at step 1021 is Y, the file, after once allocated in another empty storage unit (step 1023), is relocated (step 1029). Contrarily, if the answer at step 1021 is N, it is determined whether or not the request has been issued for relocating files according to a time zone (step 1025). If the answer at step 1025 is Y, the relocating program 9 is started to relocate the files (step 1027), and then the processing is terminated.

Figure 3:
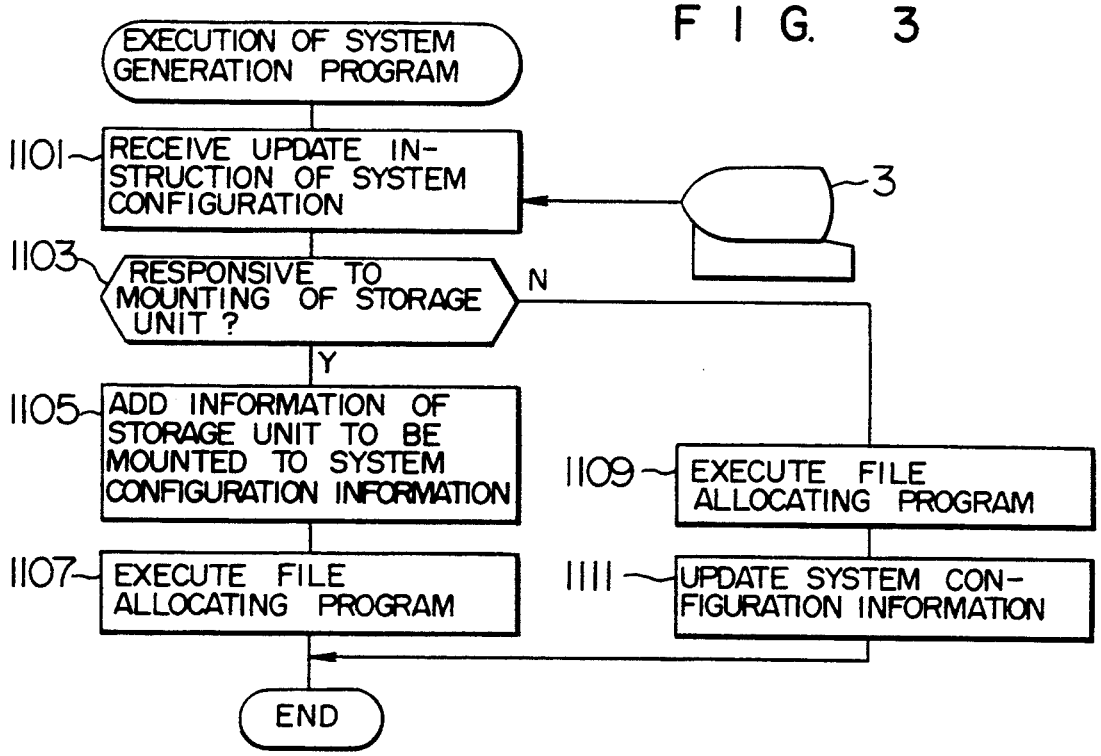
FIG. 3 is a flowchart used for explaining a method of starting the file allocating program of FIG. 2 from a system generation program.
Figure 4:
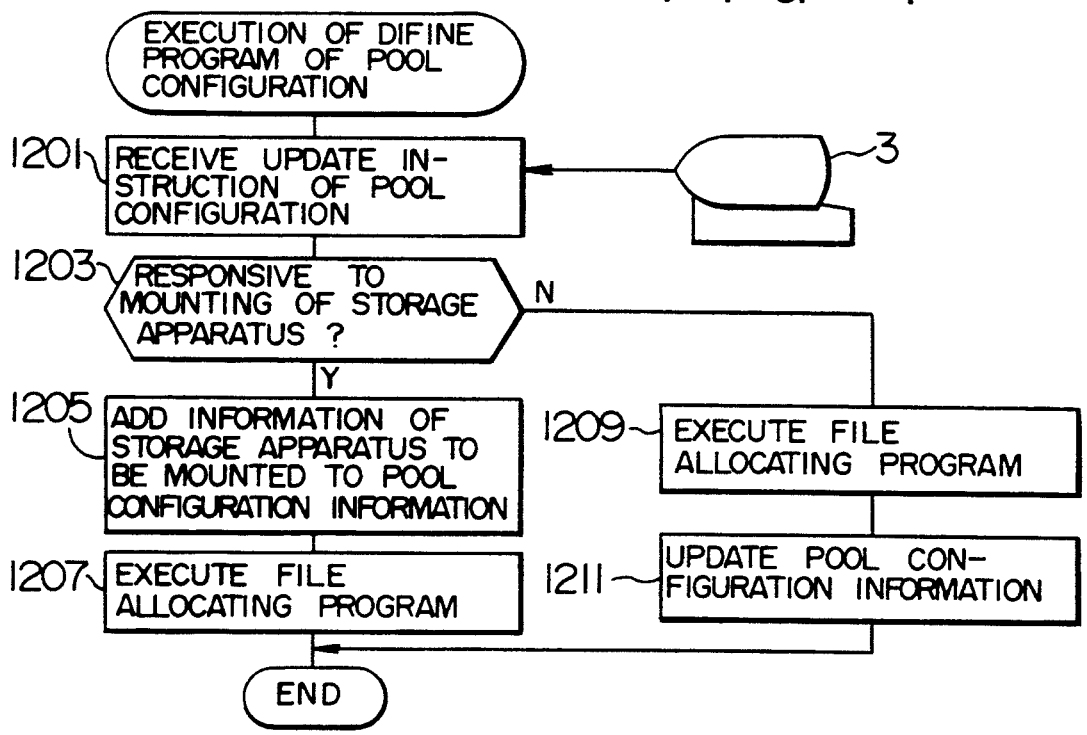
FIG. 4 is a flowchart used for explaining a method of starting the file allocating program from a pool configuration defining program.

FIGS. 3 and 4 are flowcharts of a system generation program and a define program of pool configuration, respectively.

Incidentally, upon receiving a request from a user, the allocating program 8 may be started from another program in place of a processing for directly executing the allocating program 8. An example of this program may be the system generation program shown in FIG. 3 which is started attendant on mounting of apparatus and modification in the configuration.

Based on an instruction from a user (step 1101), if this instruction is responsive to mounting of a storage unit (step 1103), attributes of the storage unit to be mounted, such as the storage unit name and designation of a control unit, a channel and so on to be connected, and definition data are added to information of the system configuration (step 1105). Next, the allocation program 8 is started (step 1107), where if a storage 1109), and the system configuration information is updated (step 1111).

Incidentally, the structure of a table for recording the system configuration program and a storing method employed in the system generation program of the allocating program 8 are not the object of the present invention, so that an explanation thereof will be omitted.

Alternatively at step 1101, in place of inputting information relative to a storage unit to be mounted, the system generation program may automatically read information relative to the storage unit stored therein after the storage unit is connected with its control unit, the central processing unit and so on. It also goes without saying that information relative to the storage unit previously registered in another storage unit may be read.

As shown in FIG. 4, it can be thought that several storage units connected to a computer system is collectively defined as a pool and a program for modifying the definition is created. Now, referring to FIG. 4, based on an update instruction inputted by a user (step 1201), if the update is attendant on mounting of a storage unit (step 1203), a pool name as a name of a group of storage units and define data relative to a storage unit to be mounted are added to the pool configuration information (step 1205), and then the allocating program 8 is started (step 1207). Contrarily, if the update is attendant on demounting of a storage unit, after files have been relocated (step 1209), the pool configuration information is updated (step 1211).

The structure of a table for recording the system configuration program and a storing method employed in the define program are not the object of the present invention, so that an explanation thereof will be omitted.

Also, in the present embodiment, it goes without saying that step 1001 is removed from the allocating program 8, or the allocating program 8 is executed so as to skip step 1001.

Figure 5:
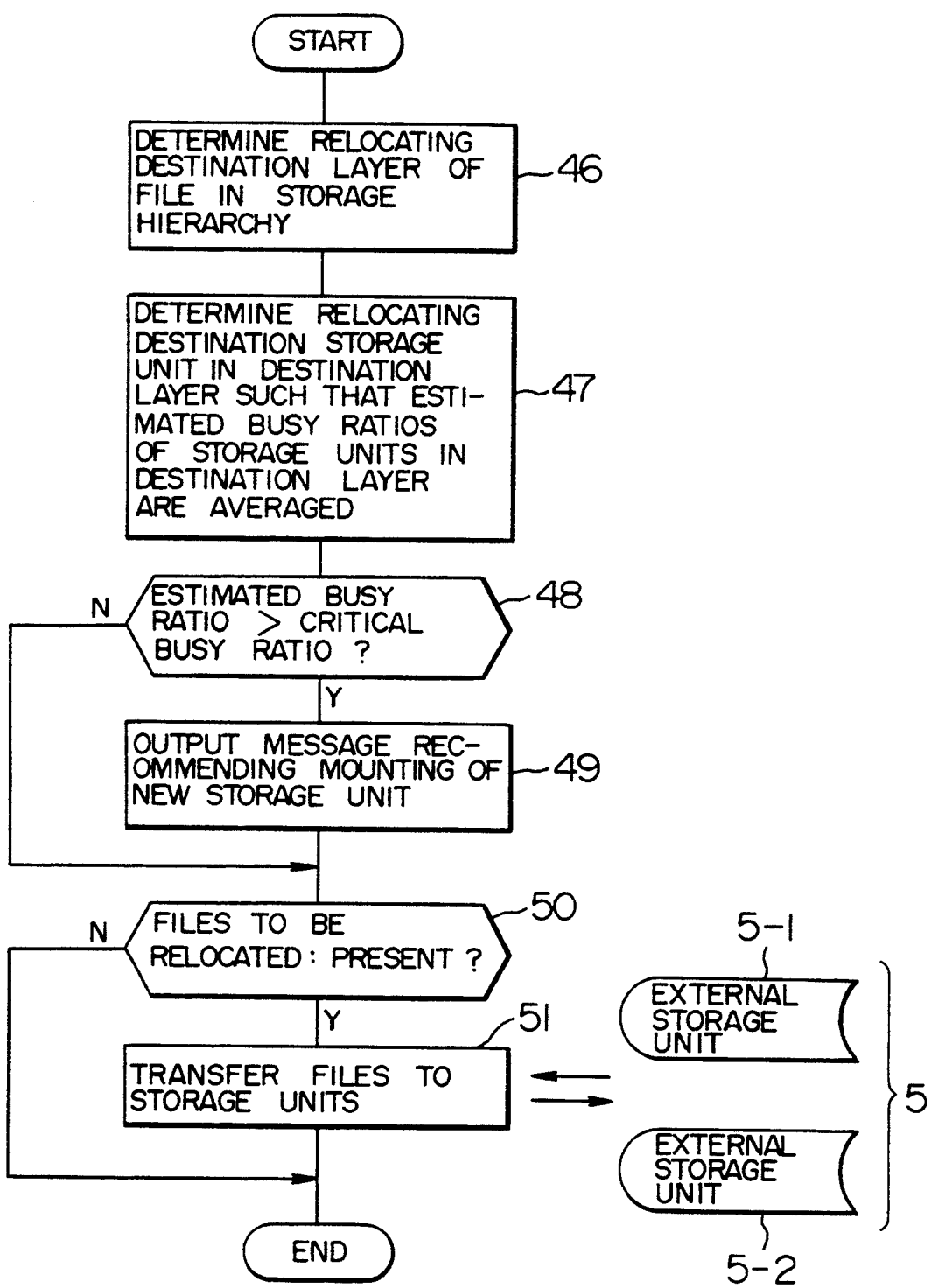
FIG. 5 is a flowchart used for explaining the processing based on a file relocating program shown in FIG. 1A.

FIG. 5 is a detailed flowchart of the file relocating program 9.

When the relocating program 9 has been started, a relocating destination layer of a file is determined in a storage hierarchy (step 46). Next, a relocating destination storage unit is determined in the destination layer such that the estimated busy ratios of storage units in the destination layer are averaged (step 47). Specifically, the mean access count 13G stored in the job record 13 for a file currently allocated in a storage unit is multiplied with the mean response time 17F of the storage unit. The product is then divided by the expecting execution time 13B to derive an estimated busy ratio of the storage unit after a relocation has been performed. The estimated busy ratio of each of the storage units is thus calculated. Then, it is determined whether there exists a storage unit, the expected busy ratio of which exceeds the critical busy ratio 17H thereof, and whether a relocation processing will not be completed within the relocation allowable time (step 48). If the estimated busy ratio does not exceed the critical busy ratio, the processing flow proceeds to step 50, whereas if its estimated busy ratio exceeds the critical busy ratio, a message for recommending mounting of a storage unit is outputted to the terminal 3 or a printer (step 49). Next, depending on whether or not the file-relocated storage unit name 15F stored in the file record 15 has been set, it is determined whether or not files to be relocated are present (step 50). Such files, if they exist, are transferred to a file-relocated storage units (step 51), and then the processing of the program is terminated.

Figure 6A:
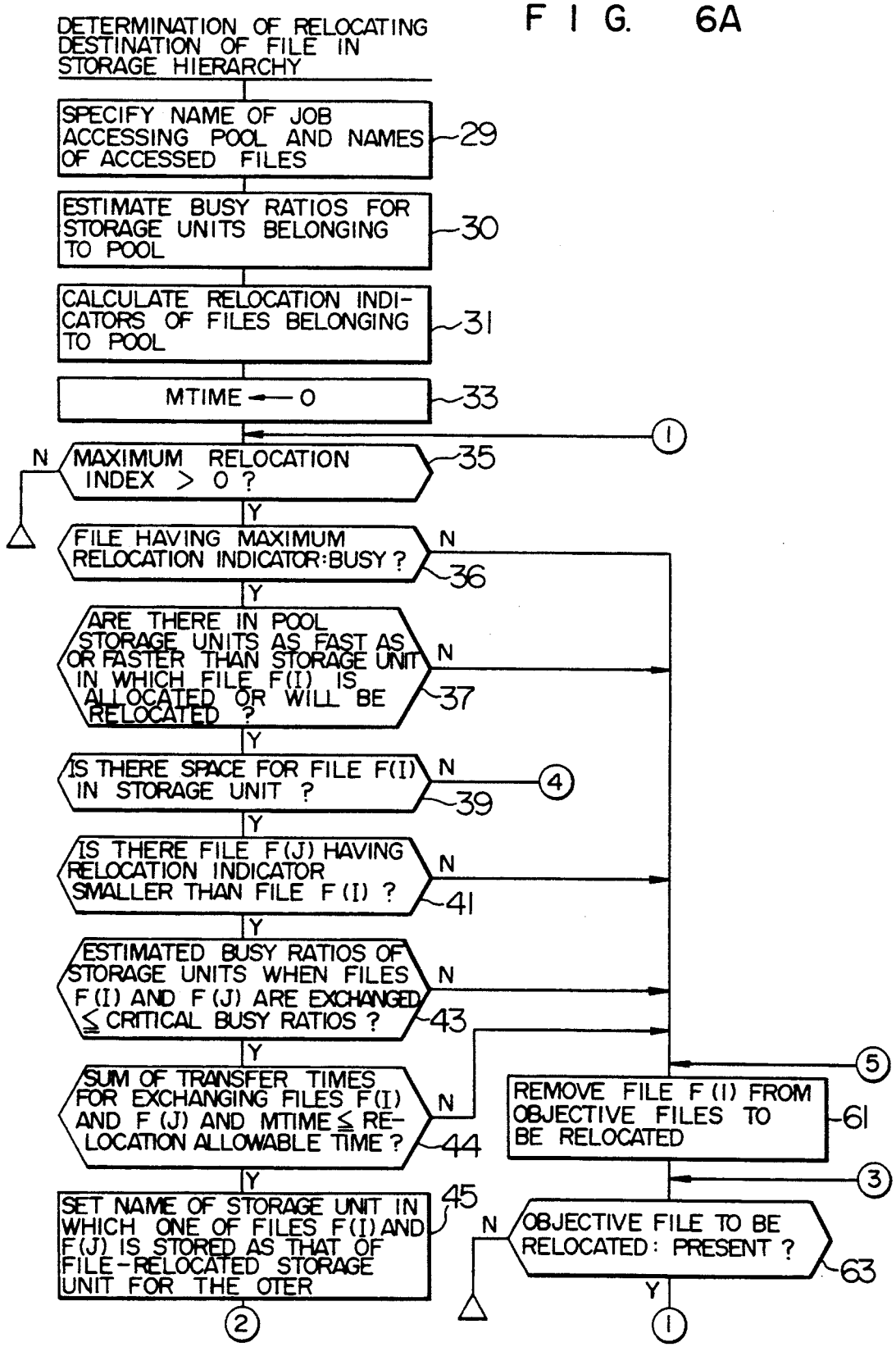
FIGS. 6A and 6B are flowcharts used for explaining the processing for determining a relocating destination of a file in a storage hierarchy.
Figure 6B:
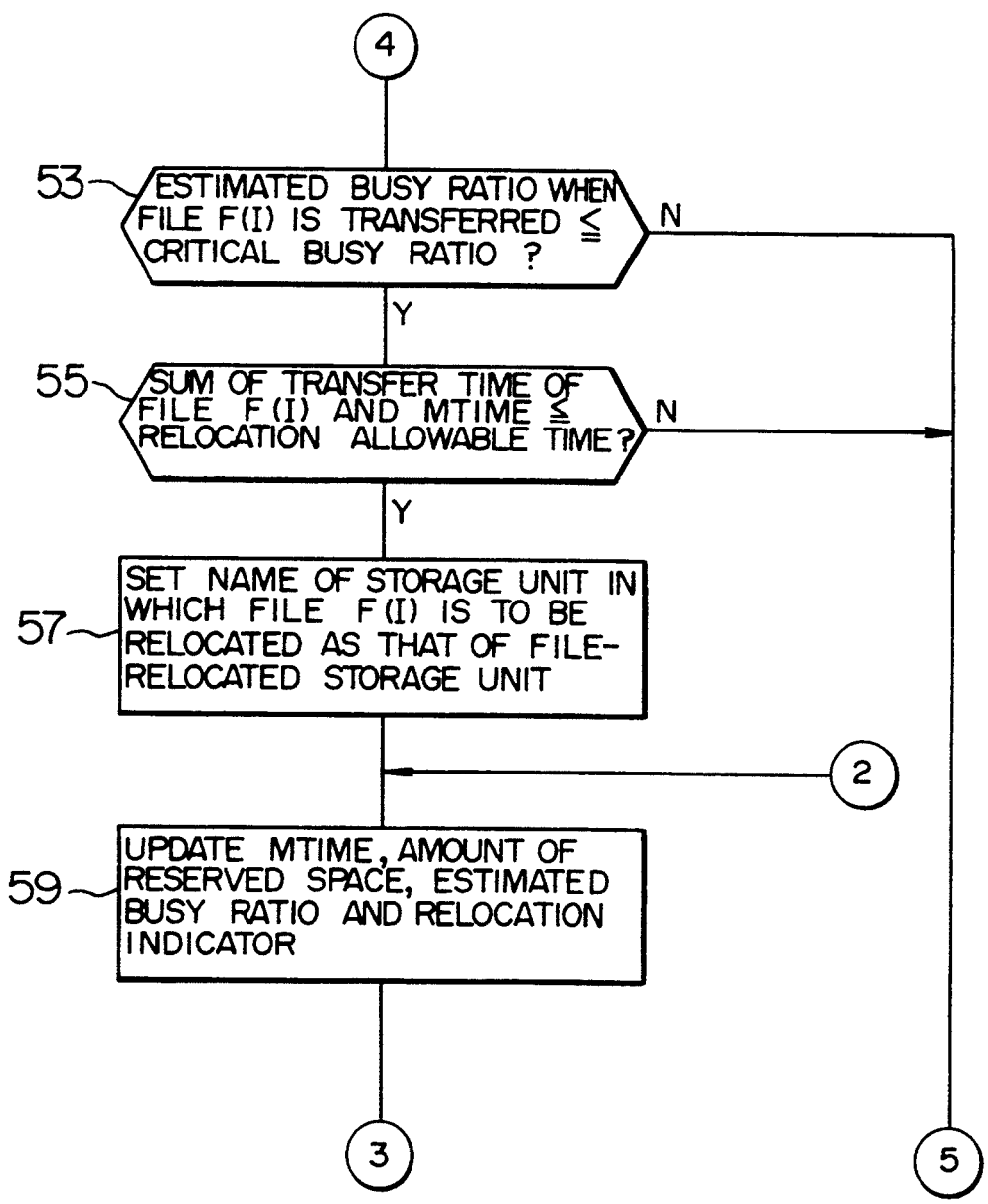

FIGS. 6A and 6B show detailed flowcharts of a processing for determining a relocating destination of a file in the storage hierarchy appearing in FIG. 5.

Based on the name of a pool to which a relocation is instructed, that is, a relocation pool, a file record 15 and a job record 13 are selected, and the name of a job belonging to the relocation pool and file names are specified from the selected records and set in the file name list 169 and the job name list 25, respectively (step 29). Next, the estimated busy ratio of each of the respective storage units belonging to the relocation pool is determined. Specifically, the estimated busy ratio is calculated by multiplying the mean access count 13G stored in the job record 13 set for a job which accesses files currently allocated in a storage unit, with the mean response time 17F of the storage unit and dividing the product by the expecting execution time 13B (step 30). Next, relocation indicators 15E of respective files F(I) belonging to the pool is calculated (step 31).

Then, a variable MTIME for accumulating an estimated value of a time required to execute a relocation is set to be zero (step 33), and it is determined whether or not the largest relocation indicator calculated at step 31 is larger than zero (step 35). If it is smaller than zero, the processing is terminated. Contrarily, if it is larger than zero, it is determined whether or not the file having the largest relocation indicator is busy (step 36). A processing from step 61 is executed if busy, and otherwise it is determined from the pool record 17 whether or not there is in the pool storage units which are as fast as or faster than the storage unit in which the file F(I) has been allocated or a storage unit in which the file F(I) is to be relocated (step 37). If no such storage unit exists, the processing from step 61 is executed. Otherwise, a value calculated by subtracting the amount 17E of reserved space from the amount 17D of empty space is compared with the file capacity 17B of the file F(I) to determine whether or not there is a space for allocating the file F(I) in the storage unit (step 39). If there is a space for the file F(I) in the storage unit, a processing from step 53 is executed. If there is no space, it is determined whether or not there is a file or a file F(J), when transferred to a slower storage unit, which has a relocation indicator smaller than that of the file F(I) and a capacity larger than the file F(I) in the faster storage unit found at step 37 (step 41). If such a file does not exist, processing from step 61 is executed. Contrarily, if the file F(J) exists, it is determined whether or not the estimated busy ratios of respective storage units are within an allowable range when the file F(I) is replaced by the file F(J) (step 43). For this determination, the estimated access counts 13F of all files recorded in the job records set for jobs included in the job name list are multiplied with the mean response time 17F of a storage unit serving as a relocating destination for the files F(I) and F(J). The product is then divided by the expecting execution time 13B, and further the estimated busy ratio of the storage unit serving as the relocating destination is added to the divided result. It is determined whether the thus calculated value exceeds the critical busy ratio 17H. If the estimated busy ratio exceeds the allowable range, the processing from step 61 is executed. Contrarily, if the estimated busy ratio lies within the allowable range, it is determined whether the sum of a transfer time required for exchanging the file F(I) with the file F(J) and the variable MTIME is within a relocation allowable time (step 44). If the sum exceeds the allowable time, the processing from step 61 is executed, whereas if it is within the allowable time, the name 15F of the storage unit in which one of the files F(I) and F(J) is stored or the name 15F of a file-relocated storage unit already set is set as the name 15F of a file-relocated storage unit for the other file record (step 45). Then, a processing from step 59 is executed.

When there is a space available for allocating the file F(I), the processing flow transfers from ④ in FIG. 6A to step 53 where determination is made to whether or not the estimated busy ratio exceeds the critical busy ratio even if the file F(I) is transferred to storage units found at step 37 as file-relocated storage units. If the expected busy ratio still exceeds the critical busy ratio, the processing from step 61 is executed. Otherwise, it is determined whether the sum of a transfer time of the file F(I) and the variable MTIME is within the relocation allowable time (step 55). If the sum exceeds the relocation allowable time, the processing from step 61 is executed. Contrarily, if the sum is within the relocation allowable time, the name of a relocating destination of the file F(I) is set in the name 15F of file-relocated storage unit (step 57).

Next, a transfer time of a file to be relocated is added to the variable MTIME, the file capacity 15B of a file to be relocated is added to the amount 17E of reserved space for a related storage unit, a value calculated by dividing the estimated access count 13G of a file to be relocated by the mean response time 17F is added to the estimated busy ratio, and the relocation indicator 15E for the related file is recalculated, thus updating the respective data (step 59). Afterward, a processing from step 63 is executed.

At step 61, the file F(I) is deleted from the list 23 of objective files to be relocated. Next at step 63, it is determined whether or not the list 23 still includes objective files to be relocated. If such objective files exist, the processing flow returns to step 35 to execute step 37. Otherwise, the processing is terminated.

A modified example of the flowchart shown in FIG. 6A will be next described.

At step 43, if a plurality of channels are connected to a storage unit, the number of connected channels may be previously set in the pool record 17 as an attribute of the storage units belonging to the pool, and the busy ratio may be calculated by dividing the product of the all preset access count 13F and the mean response time 17F of a storage unit designated as the relocating destination by the number of channels.

Further, the following processing may be added before step 43. It is determined whether the mean response time of a storage unit to be used as a relocating destination is equal to that of a storage unit in which files have previously been stored. If both are equal, the difference in the estimated busy ratio between both of the storage units is examined before and after the file F(I) is exchanged with the file F(J). If the difference is reduced, a processing from step 45 is executed, and otherwise the processing from step 61 is executed.

On the other hand, if the mean response times of the two storage units are different, the step 43 may be executed.

Also at steps 43 and 59, the actual response time 13H may be used in place of the mean response time 17F.

Further alternatively, contents of a relocation may be informed to a user through the terminal 3, a printer or the like in place of the automatic file relocating processing executed at step 51. Furthermore, a job execution parameter of a relocation job may be outputted so as to facilitate the user to execute a relocation based on the contents thereof.

Figure 7:
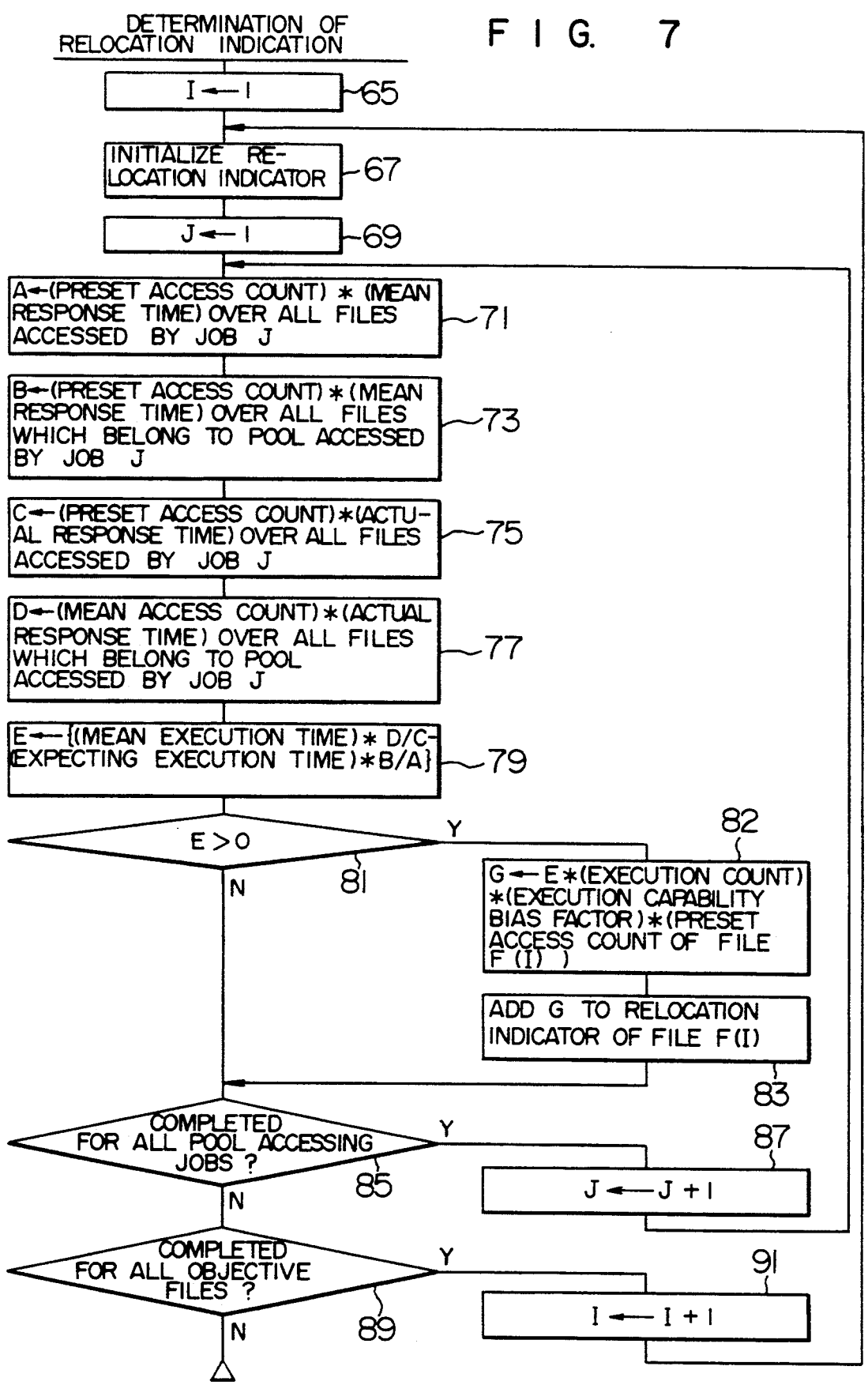
FIG. 7 is a flowchart used for explaining in detail the processing for determining a relocation indicator appearing in FIGS. 6A and 6B.

FIG. 7 is a detailed flowchart showing the operation of determining the relocation indicator shown in FIG. 3.

First, a counter I indicative of an entry number of an objective file name list 169 is set to be one (step 65), the relocation indicator 15E for the file F(I) to be zero (step 67), and a counter J indicative of an entry number of a job name list 25 to be one (step 69).

Next, for each of files accessed by a job J, the product of the preset access count 13F and the mean response time 17F of a storage unit in which the file is allocated is calculated, and the sum of the products over all the accessed files is set to a variable A (step 71). The mean response time 17F is derived by specifying the pool name 17A and the storage unit name 17B stored in the pool record 17 which is specified by a pool name stored in a file record 15 corresponding to the file.

For each of files included in the job name list 25 accessed by the job J, the product of the preset access count 13F and the mean response time 17F is calculated, and the sum of the products over all the accessed files is set to a variable B (step 73).

Then, for each of files accessed by the job J, the product of the mean access count 13G and the actual response time 13H is calculated, and the sum of the products over all the accessed files is set to a variable C (step 75).

Also, for each of files included in the job name list 25 accessed by the job J, the product of the mean access count 13G and the actual response time 13H is calculated, and the sum of the products over all the accessed files is set to a variable D (step 77).

Next, a value calculated by dividing the product of the expecting execution time 13B of the job J and the variable B by the variable A is subtracted from a value calculated by dividing the product of the mean execution time 13C and the variable D by the variable C, and the resultant value is set to a variable E (step 79).

Then, it is determined whether or not the variable E is larger than zero (step 81). If the variable is larger than zero, after the product of the variable E, the execution count 13D, the bias factor 13I and the preset access count 13F of the job J to the file F(I) is set to a variable G (step 82), the value of the variable G is added to the relocation indicator 15E of the file F(I) (step 83).

Now, it is determined whether the above described processing has been completed for all pool accessing jobs (step 85). If it has not been completed, the counter J is incremented by one (step 87), followed by the processing flow returning to step 71 to repetitively execute the processing of steps 71–85. On the other hand, if the processing has been completed, it is determined whether the above processing has been completed for all objective files (step 89). If files to be relocated still remain, the counter I is incremented by one (step 91), and then the processing flow jumps back to step 67 to repetitively execute the processing of steps 67–89. If the processing has been completed for all objective files to be relocated, the processing for calculating the relocation indicator is terminated.

Next, an example of a modified operation of the processing flow shown in FIG. 4 will be described. The processing at steps 72 and 73 may be executed using the actual response time 13H per job unit or the actual response time 165A per file unit in place of the mean response time 17F. Also, at steps 57 and 77, the mean response time 17F may be used in place of the actual response time 13H. Furthermore, the preset access count 13F may be used in place of the mean access count 13G.

Also, as another embodiment, step 79 may be executed by a calculating method which subtracts a value set to the variable B from a value set to the variable D and adds the resultant difference to the variable E without using the expecting execution time 13B and the mean execution time 13C.

Figure 8A:
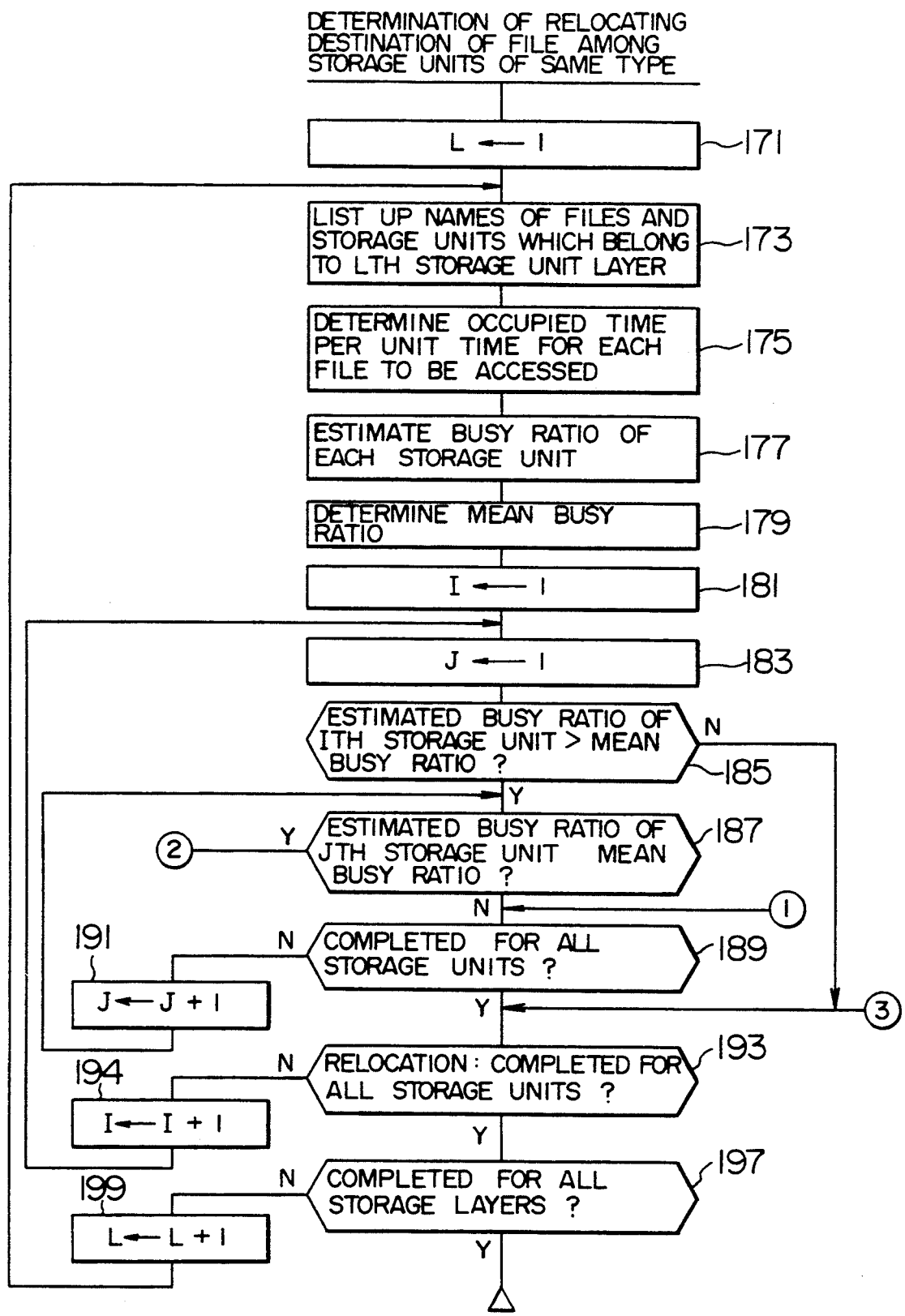

FIGS. 8A and 8B shows in detail the operation of step 47 shown in FIG. 5, that is, a flowchart for explaining in detail a method of relocating files so as to average access frequencies among storage units in the same storage hierarchy.

When the program is started, an initial value "1" is set in a counter L indicating a layer in the storage hierarchy (the first layer) at step 171. Then, names of files belonging to the Lth storage unit layer (initially the first layer) and the name of storage units in which the files are allocated are listed up (step 173), and the names 169A of storage units in the objective file name list 169, objective file names 169B and an occupied time 169C per unit time for each file to be accessed are set (step 175). The occupied time 169C is calculated by multiplying the access frequency of the file with the actual response time 13H and dividing the product by the unit time. Next, access occupied times per unit time of files stored in each of storage units are summed to set an estimated busy ratio 17H for each of the storage units (step 177), and a mean busy ratio of the whole storage unit for relocation is calculated from the results of step 177, i.e., the estimated busy ratios 17H (step 179). Next, the counter I indicative of the entry number of the storage unit name 17B is set to be one (step 181), and the counter J is also set to be one (step 183).

Next, it is determined whether or not the estimated busy ratio of the first storage unit is larger than the mean busy ratio (step 185). If the estimated busy ratio is smaller than the mean busy ratio, a processing from step 193 is executed. Contrarily, if the estimated busy ratio is larger than the mean busy ratio, it is determined whether or not the busy ratio of the Jth storage unit is smaller than the mean busy ratio (step 187). If the busy ratio of the Jth storage unit is smaller than the mean busy ratio, a processing from step 201 is executed. On the contrary, if the busy ratio of the Jth storage unit is larger than the mean busy ratio, it is determined whether the comparison with the mean busy ratio performed at step 187 has been completed for all storage units (step 189). If the comparison check has been completed, the processing from step 193 is executed. If there still remain storage units for which the comparison check of step 187 is to be made, the counter J is incremented by one (step 191), and then the processing flow returns to step 187 to repeat the same processing.

At step 193, it is determined whether or not the relocation has been completed for files allocated in all objective storage units. If the relocation has not been completed, the counter I is incremented by one (step 194), followed by the processing returning to step 183 to repeat the same processing. When the relocation processing has been completed, it is determined whether or not an averaging processing has been completed for all layers in the storage hierarchy (step 197). If layers subjected to the averaging processing still remains in the storage hierarchy, the counter L is incremented by one (step 199), and the processing flow returns to step 173 to repeat the same processing. When the averaging processing has been completed for all layers, the processing of FIG. 8A is terminated.

If the busy ratio of the Jth storage unit is smaller than the mean busy ratio (step 187), the processing flow jumps to step 201, where one is set in a counter processing file K indicative of an entry number of the objective file name 169B in the objective file name list 169 for the Ith storage unit. Next, it is determined whether or not there is a space for allocating a file K in the storage unit J (step 203). If there is an enough space amount, a processing from step 209 is executed. Contrarily, if there is no space amount, it is determined whether or not the check at step 203 has been completed for all objective files in the Ith storage unit (step 205). If the check has been completed for all the files, the processing flow returns to step 189 to repeat the same processing. Whereas, if the check has not been completed, the counter K is incremented by one (step 207), and then the processing flow returns to step 203 to repeat the same processing.

At step 209, it is determined whether or not transfer of the file K to the Jth storage unit causes the busy ratio thereof to exceed the mean busy ratio. If the busy ratio of the storage unit exceeds the mean busy ratio, the processing flow returns to step 189 to repeat the same processing. If the busy ratio of the storage unit, on the contrary, does not exceed the mean busy ratio, the name of the relocating destination for the file K, i.e., the Jth storage unit is set in the file-relocated storage unit name 15F in the file record generated for the concerned file (step 211). Next, the estimated busy ratios 167A, the amounts 17E of empty space and the objective file name lists 169 of the respective Ith and Jth storage units are updated (step 213). Thereafter, it is determined whether or not the estimated busy ratio of the Ith storage unit is larger than the mean busy ratio (step 215). If the estimated busy ratio is larger than the mean busy ratio, the processing flow returns to step 209 to repeat the same processing. If it is smaller than the mean busy ratio, the processing flow returns to step 193 to repeat the same processing.

As an alternative embodiment, the mean response time 17E of a storage unit in which a concerned file is allocated may of course be used at step 175 in place of the actual response time 165A.

Also, at step 177, when there are a plurality of channels connected to a storage unit, the number of the connected channels may be previously set as an attribute of the storage units belonging to the pool, and the busy ratio may be calculated by dividing the estimated busy ratio calculated at step 177 by the number of channels in order to correct the estimated busy ratio.

As described above, a group of files allocated in a previously designated storage unit group including storage units of different access capabilities are automatically relocated, within an allowable relocation time, so as to minimize an excess execution time of each job, the estimated execution time of which is longer than an execution time expected to the job, so that the storage units can be utilized conforming to user's expectation.

Also, the access capability can be improved by balancing access loads among storage units having the identical access capabilities.

When even a relocation does not result in preventing the access busy ratio to a storage unit from exceeding a previously set value, a message for recommending extension of a storage unit is outputted to thereby readily perform a management of the storage unit.

Next, a file relocating system according to a second embodiment of the present invention will hereinbelow be described.

Figure 9:
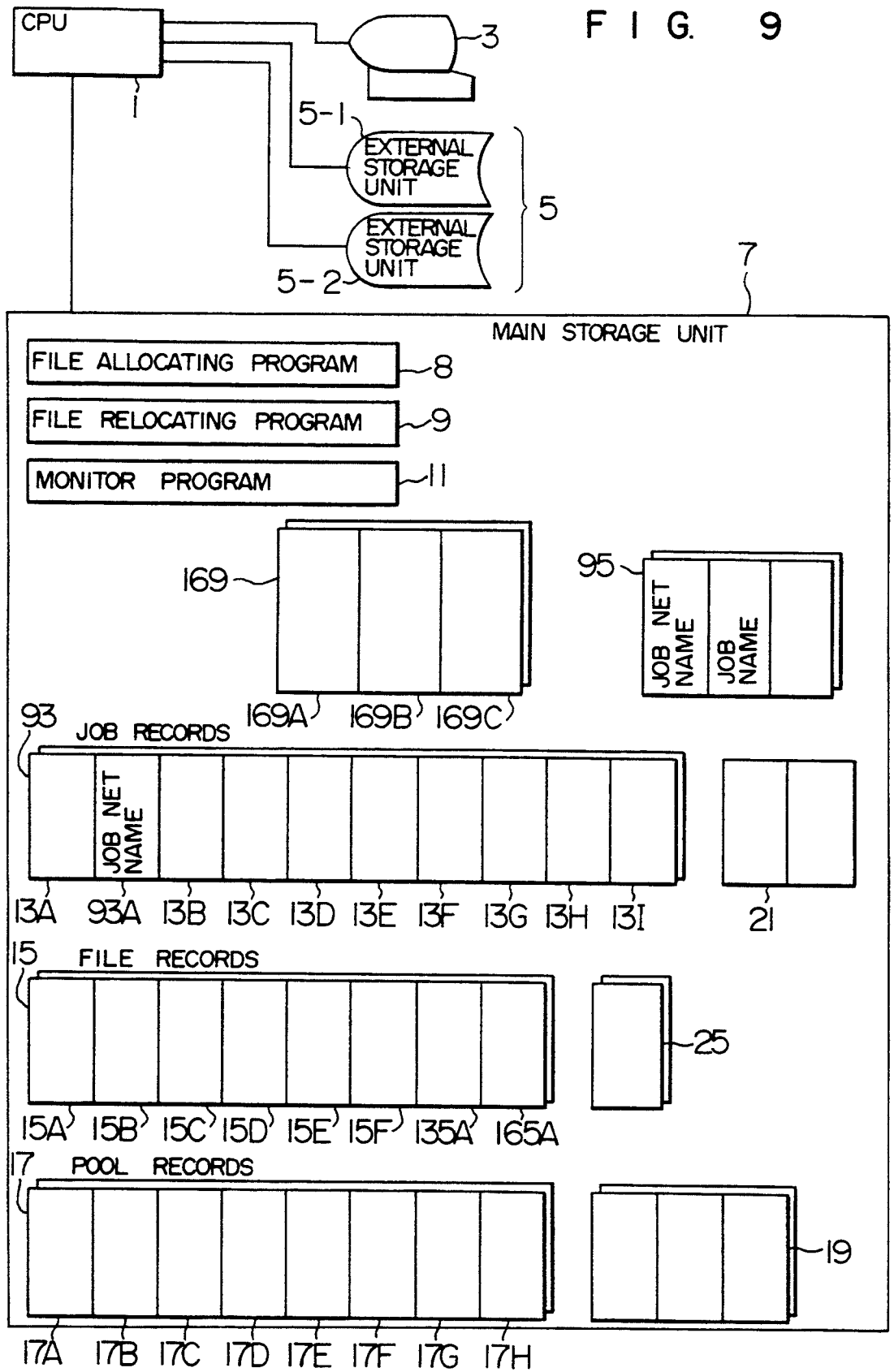
FIG. 9 is a block diagram of the whole configuration of a file relocating system according to a second embodiment of the present invention.

FIG. 9 is a block diagram showing the whole configuration of a file relocating system of the second embodiment.

While a file relocating destination is determined so as to satisfy an expecting execution time designated by a user for each job in the first embodiment, the second embodiment determines a file relocating destination so as to satisfy an expecting execution time designated by a user for a group of sequentially executed jobs, that is, a job net. This enables an automatic relocation of files in storage units having different access capabilities so as to satisfy an execution time expected to a work processing collectively composed of jobs, whereby the storage units can be utilized conforming to user's expectation.

In the second embodiment, the same components as those in FIG. 1A are designated the same reference numerals and explanation thereof will be omitted. Therefore, only different aspects will be explained.

While the job record 13 shown in FIG. 1A simply has the job name 13A, a job record 93 shown in FIG. 9 is provided with a job net name 93A in addition to a job name 13A. It is also provided with a set 95 of a job net name and names of jobs belonging to the job net.

Figure 10A:
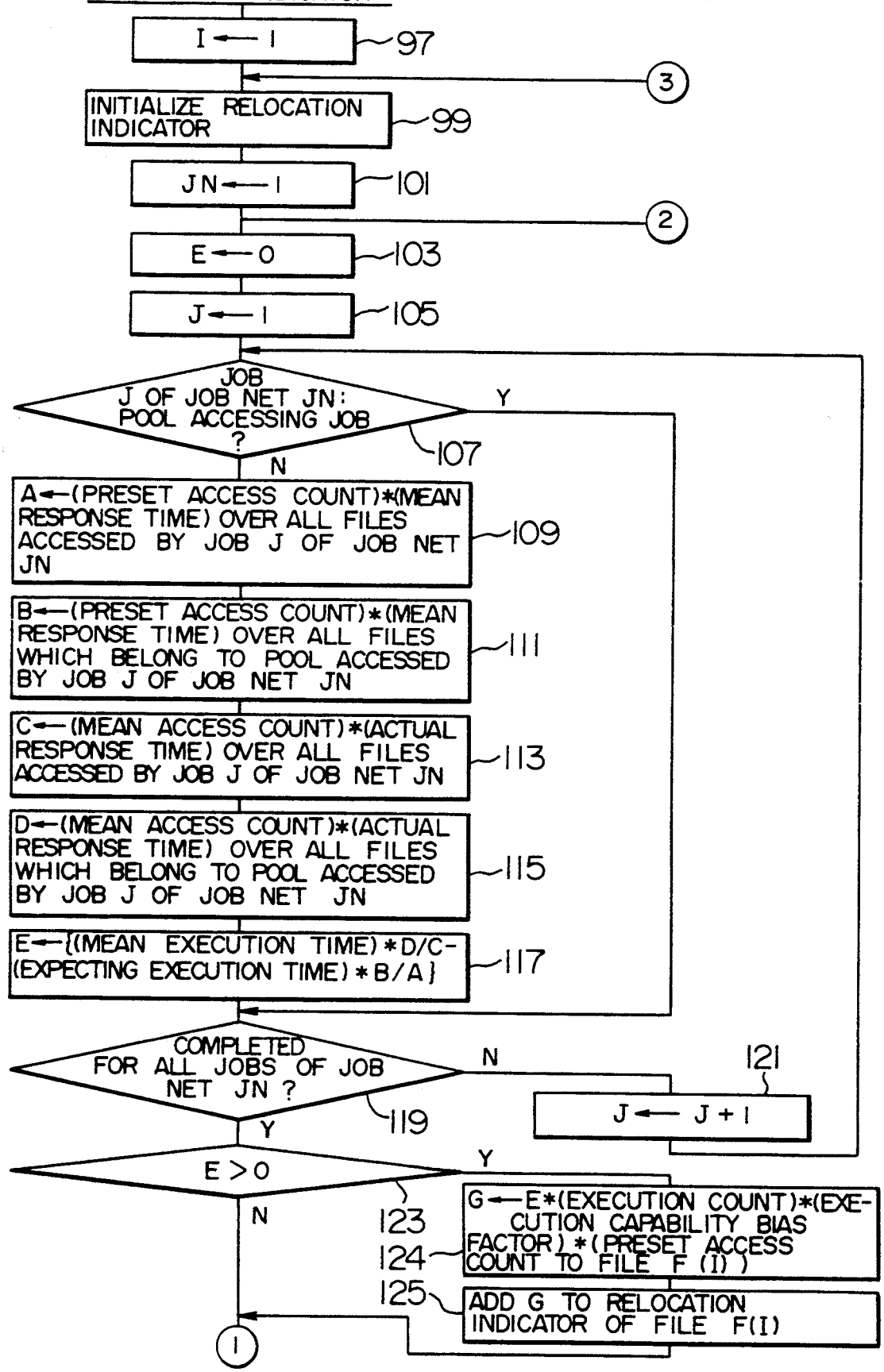
FIGS. 10A and 10B are flowcharts used for explaining in detail the processing for determining a relocation indicator appearing in FIG. 9.
Figure 10B:
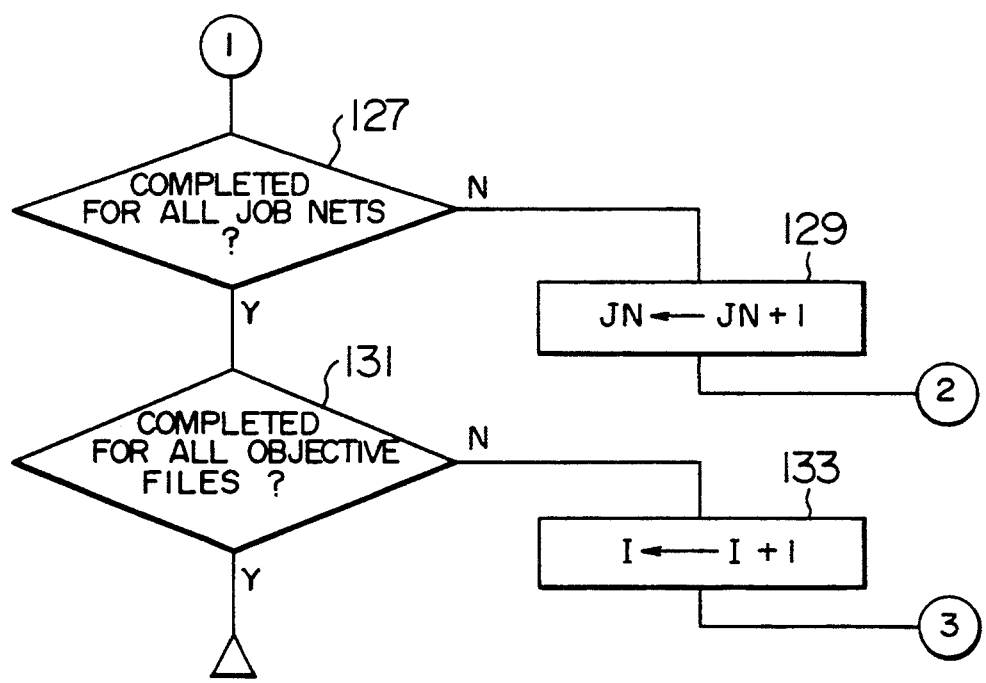

FIGS. 10A and 10B show flowcharts for explaining the operation of the second embodiment shown in FIG. 9.

First, a counter I indicative of an entry number of a storage unit name 17B is set to be one (step 97), and a relocation indicator is initialized (step 99). Next, a counter JN indicative of an entry number of the job net name 95 is set to be one (step 101), and a variable E is set to zero (step 103). Similarly, a job counter J is set to be one (step 105).

It is determined whether or not a job J in a job net JN exists in a pool accessing job name list 25 (step 107). If the job J does not exist in the list 25, processing from step 119 is executed. If it exists in the list 25, for each file accessed by the job J in the job net JN, the product of a preset access count 13F and a mean response time 17F of a storage unit, in which the file is allocated, is calculated based on a job record 93 of the job J in the job net JN, and the sum of the products over all the accessed files is set to a variable A (step 109).

When the job J in the job net JN is included in the access job name list 25, the product of the preset access count 13F and the mean response time 17F is calculated for each of files belonging to a pool accessed by the job J, and the sum of the products calculated over all of the files belonging to the pool is set to a variable B (step 111). Next, for each of the files accessed by the job J in the job net JN, the product of a mean access count 13G and an actual response time 17F is calculated, and the sum of the products calculated over all of the accessed files is set to a variable C (step 113). If the job J in the job net JN is included in the pool accessing job name list 25, the product of the mean access count 13G and the actual response time 13H is calculated for each of files belonging to the pool accessed by the job J, and the sum of the products calculated over all the file belonging to the pool is set to a variable D (step 115). Afterward, a value calculated by dividing the product of the mean execution time and the variable D by the variable G is subtracted from a value calculated by dividing the product of the expecting execution time 13B and the variable B by the variable A, and the resultant value is added to the variable E (step 117).

Then, it is determined whether or not the above-mentioned processing has been completed for all the jobs in the job net JN (step 119). If the processing has not been completed, the counter J is incremented by one (step 121), and thereafter the processing flow returns to step 107 to repeat the same processing. When the processing has been completed for all the jobs, it is determined whether the variable E is larger than zero (step 123). Only when the variable E is larger than zero, the product of the variable E, an execution count 13D, an execution capability bias factor 13I and a preset count 13F of accessing to the file F(I) from the job net JN is calculated and set to a variable G (step 124). Then, a value set to the variable G is added to the relocation indicator 15E of the file F(I) (step 125). Next, it is determined whether or not the processing has been completed for all job nets (step 127). If unprocessed job nets still remains, after the counter JN is incremented by one (step 129), the processing flow returns to step 103 to repeat the same processing. When the processing has been completed for all job nets, it is determined whether or not the processing has been completed for all objective files to be relocated (step 131). If the processing has not been completed, the counter I is incremented by one (step 133), and then the processing flow returns to step 99 to repeat the same processing. When all the objective files have been processed or relocated, the processing for calculating the relocation indicator is terminated.

Incidentally, as an alternative embodiment, the actual response time may be used for the calculations executed at steps 109 and 111 in place of the mean response time 17F. Likewise, the mean response time 17F may be used at steps 113 and 115 in place of the actual response time. Also, the preset access count 13F may be used in place of the mean access count 13G. Further, as yet another embodiment of step 117, the calculation executed at step 117 may be performed by subtracting a value set to the variable D from a value set to the variable B for the job J, and adding the resultant value to the variable E.

As described above, files are automatically relocated among storage units having different access capabilities, within a relocation allowable time, so as to minimize an excess execution time of each job net, which may be longer than an execution time expected to each job net unit, so that the storage units can be utilized conforming to user's expectation to the execution time required to process a work typically including a plurality of jobs.

Next, a file relocating system according to a third embodiment of the present invention will hereinbelow be described.

Figure 11:
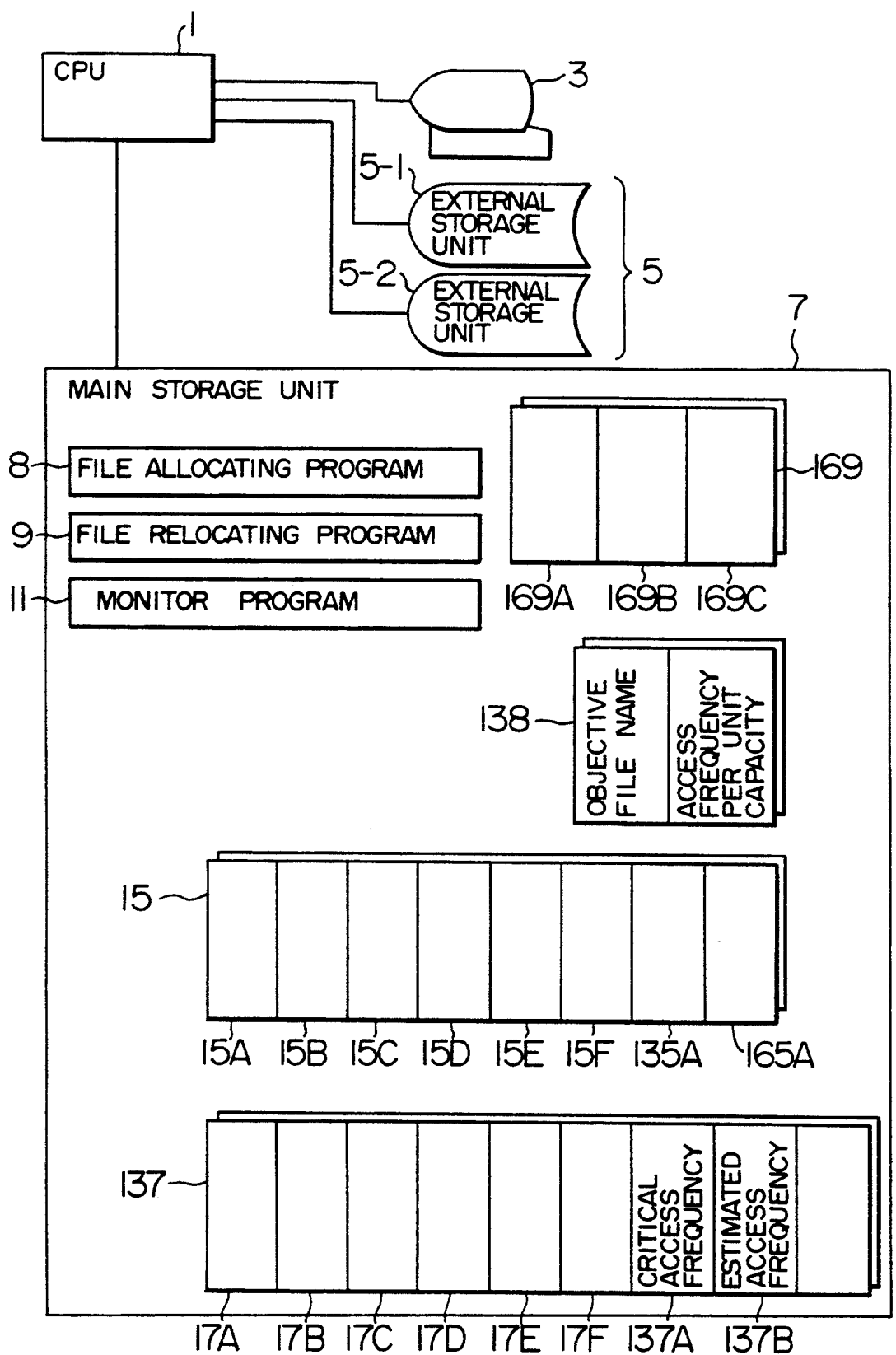
FIG. 11 is a block diagram illustrating the whole configuration of a file relocating system according to a third embodiment of the present invention.

FIG. 11 is a block diagram showing the configuration of a file relocating system of the third embodiment.

While the first and second embodiments determine file a relocating destination so as to satisfy an expecting execution time designated by a user for executing each job and job net, respectively, the third embodiment determines a file relocating destination so as to a limit busy ratio of each storage unit within an allowable range based on an access frequency per unit capacity of each file. This permits highly frequently accessed files per unit capacity to be allocated in faster storage units, thereby improving the utilizing efficiency of such highly accessed files and faster storage units.

In the third embodiment, the same components as those in the first embodiment are designated the same reference numerals, and explanation thereof will be omitted. Therefore, different points only will be explained.

In FIG. 11, reference numeral 137 designates a pool record which includes a pool name 17A, a storage unit name 17B, an amount 17C of space available in the storage unit, an amount 17D of empty space, an amount 17E of reserved space, a mean response time 17F, a critical access frequency 137A per unit time, and an estimated access frequency 137B. This record is generated for each pool. When a pool is composed of a plurality of storage units, data 17B, 17C, 17D, 17E, 137A and 137B are set for each of the storage units. In this case, names and attributes of storage units are sorted in the ascending order of mean response time, that is, faster storage units.

As the mean response time 17F stored in the pool record 137, a direct access response time and a sequential access response time are separately set. In a file record, a file access frequency 135A per unit time is set for each file access method, while a file relocating program 9 may properly use the mean response time. In the following explanation, it is supposed that a unique mean response time is used for simplicity.

Also, the critical access frequency 137A, when a storage unit is connected with a plurality of channels, may be a value calculated by multiplying a critical access frequency, when connected with a single channel, with the number of connected channels, in consideration of the plurality of channels.

Reference numeral 138 designates an objective file name list in which names of objective files belonging to a relocation pool and access frequency per unit capacity thereof are sorted in the descending order of the access frequency per unit.

A file name 15A, a pool name 15C, the pool name 17A, the storage unit name 17B, the amount 17C of space, the mean response time 17F and the critical access frequency 137A are previously set by a user.

A file capacity 15B, the access frequency 135A and the amount 17D of empty space are supposed to be respectively set by a monitor program 11. However, these values may be set by user without using the monitor program 11. Other values are supposed to be set by the relocating program 9.

Note that in FIG. 11 an input/output field for communicating data with respective files and a work area necessary to execute a program are omitted for avoiding complexity, similarly to the first embodiment.

FIG. 12 illustrates a flowchart for a file relocation determination processing among storage units of FIG. 7, that is, a file relocation determination processing as another embodiment of step 46 of FIG. 2.

Based on an inputted objective pool name, names of files belonging to the pool are specified from file records 135, and access frequencies 135A are sorted in the order of the access frequency per unit capacity which is calculated by dividing the access frequency 135A by a file capacity 15B, and set in the objective file name list 138 (step 141).

Afterward, a counter II indicative of an entry number of the objective file name list is set to be one (step 143), and a counter JJ indicative of an entry number of storage units belonging to the objective pool is also set to be one (step 145).

Then, it is determined whether or not a file II is unused (step 146). If it is being used, a processing from step 153 is executed. If unused, it is determined whether or not allocation of the unused file II in a storage unit JJ causes the sum of estimated access frequencies 137B of files stored in the storage unit JJ and an access frequency 135A of the file II to exceed the critical access frequency of the storage unit JJ (step 147). If the sum exceeds the critical access frequency, a processing from step 159 is executed. On the contrary, if the sum is within the critical access frequency, it is determined whether or not there is an amount of space available in the storage unit JJ for allocating the file II (step 149). If there is no space for allocation, the processing from step 159 is executed. If there is such an empty space available, the storage unit name of the relocating destination of the file II, that is, the storage unit JJ is stored in a file-relocated storage unit name 15F (step 151), and then an amount 1E of reserved space and the estimated access frequency 137B are updated by adding a file capacity 15B of the file II to an amount 17E of reserved space and adding the access frequency 135A per unit time of the file II to the estimated access frequency 137B, respectively (step 152).

Next, it is determined whether or not there exist files in the objective file name list 138 which have not been relocated (step 153). If there still exist files for which the relocation processing has not been executed, the counter II is incremented by one (step 154), and the processing flow returns to step 146 to repeat the same processing. When the relocation processing has been completed for all objective files, this processing of FIG. 12 is terminated.

At step 159, it is determined whether there are other storage units in the objective pool. If other storage units exist, the counter JJ is incremented by one (step 161), and then the processing flow returns to step 146 to repeat the same processing. If there is no other storage unit, the processing from step 151 is executed.

As described above, the file relocation is controlled such that files highly frequently accessed per unit capacity are allocated in faster storage units within a limit of the concentration of accesses to the storage units, thereby improving the utilizing degree of relatively faster and expensive storage units.

A relocate request for relocating files according to time zone executed at step 1025 based on the file allocating program 8 shown in FIG. 2 may be issued, when terminating an on-line program or as one of operations for starting processing, for transferring files stored in a faster storage unit used for an on-line processing to a relatively slower storage unit. A file relocating method for this purpose will be explained with reference to FIG. 13.

Figure 13:
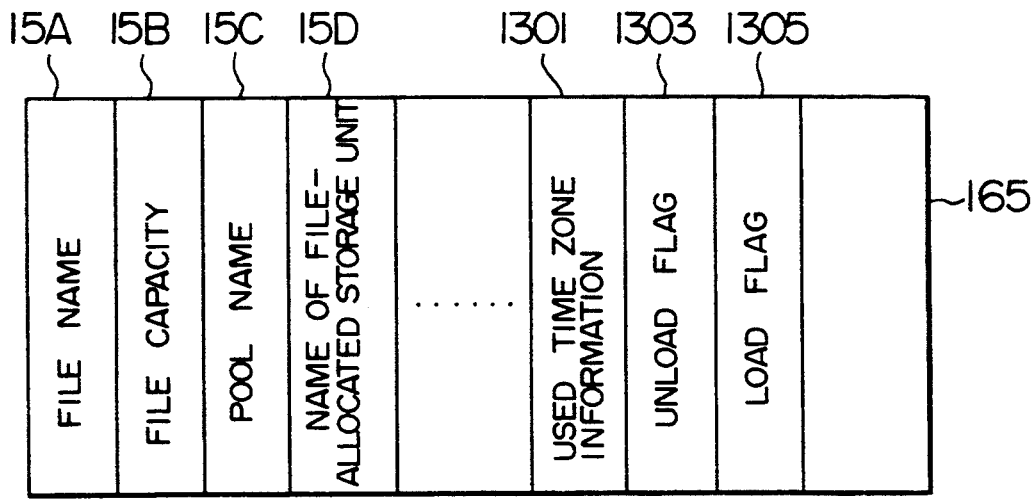
FIG. 13 is a diagram illustrating another embodiment of the file record shown in FIG. 1C.

FIG. 13 shows the structure of a file record referenced by a file allocating program according to another embodiment. As components of the file record, a used time zone information field 1301 for storing information indicative of a used time zone of a file, an unload flag 1303 for designating the necessity of data transfer when a file is transferred from a faster storage unit to a slower storage unit, a load flag 1305 for designating the necessity of data transfer when a file is transferred from a slower storage unit to a faster storage unit are added to the file record 165, as shown in FIG. 13. As examples of the used time zone information 1301, there are an execution time zone of a particular program represented by an on-line program, an identifier indicating a time zone, a pair of a start time and an end time, and so on. Therefore, the used time zone information 1301 is loaded with a program name, an identifier, a time and its kind. Contrary to a used time zone, the used time zone information 1301 may indicate an unavailable time zone. When a program name is set in the information field 1301, a file relocation is requested according to a used time zone with the program name being as a parameter when starting or terminating the program. When an identifier is set in the information field 1301, an indication is made from a terminal 3 for indicating the start or end of a particular period. When a time is set in the information field 1301, a start time or an end time is recognized by a timer disposed in a computer.

Figure 14:
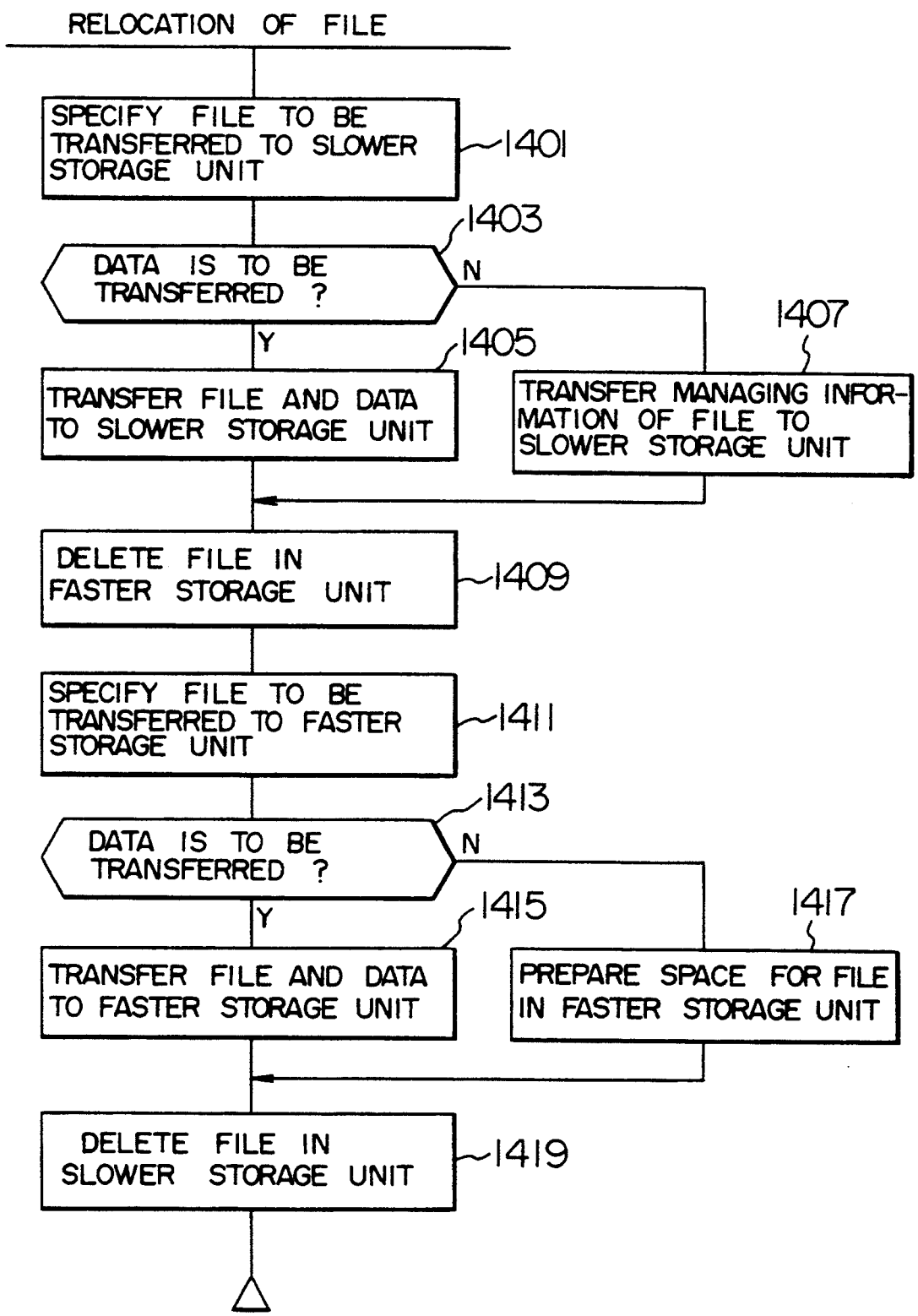
FIG. 14 is a flowchart used for explaining a file relocating processing using the file record shown in FIG. 13.

FIG. 14 is a flowchart of a processing using the file record shown in FIG. 13.

As a processing of the file relocating program 9 a suitable to this example, a processing flow of FIG. 14 is provided in place of step 1027 of FIG. 2.

When the processing flow is started, a file, a used time zone of which has been terminated, is specified by referring to the used time zone information 1301 stored in a file record of each file (step 1401), and it is determined whether or not the unload flag 1303 of the file is on (step 1403). If the unload flag 1303 is on, the file and data contained therein are transferred to a relatively slow storage unit (step 1405). If the flag is not on, management information of the file only is transferred to a slower storage unit (step 1407). Then, the file stored in a fast storage unit is deleted (step 1409). Next, a file which is to be next used is specified (step 1411), and it is determined whether or not the load flag 1305 of the thus specified file is on (step 1413). If the load flag 1305 is on, the file and data contained therein are transferred to a relatively fast storage unit (step 1415). If it is not on, an empty area is reserved in a faster storage unit for this file (step 1417). Then, the file in a slow storage unit is deleted (step 1419).

Incidentally, as components of the file record 165, columns may be provided for setting information relative to a data save flag and a storage unit to which data is saved, such that when the data save flag is on, data contained in a file may be saved in the data save storage unit in place of executing steps 1409 and 1419.

Figure 15:
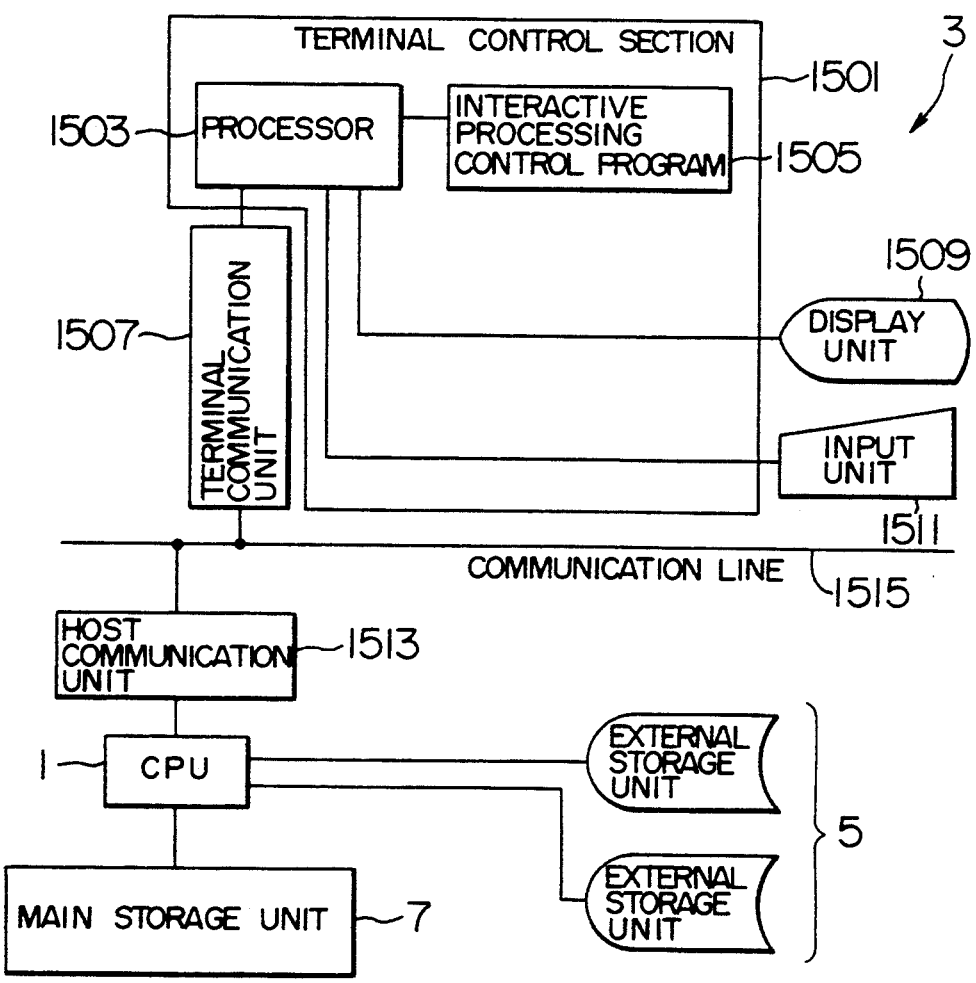
FIG. 15 is a block diagram illustrating the whole configuration of the system shown in FIG. 1A when a work station is used as a terminal unit.

FIG. 15 shows the whole configuration of the data relocating system using a work station as a terminal unit of FIG. 1A.

As shown in FIG. 1A, the CPU 1 of a host is connected with each terminal unit 3 through a communicating cable so that a display on a screen of the terminal unit 3 and data communication are executed by instructions from the host CPU 1. Alternatively, as shown in FIG. 15, the host and the terminal unit may be coupled through a host communication unit 1513 and a terminal communication unit 1507 each connected to a communication network 1515. The terminal unit 3 is composed of at least a terminal control section 1501, a display unit 1509 and an input unit 1511, and the terminal control section 1501 is composed of at least a processor 1503 and an interactive processing control program 1505. The configuration of programs and tables in a main storage unit 7 may be equal to either of the first to third embodiments.

The interactive processing control program 1505 may be started by a user request receiving instruction supplied from the host to the terminal unit in a processing of inputting a user's request at step 1001 shown in FIG. 10 so as to transfer the user's request inputted from the input unit 1511 associated with the terminal unit to the host side. Alternatively, the interactive processing control program 1505 may be started by a user's instruction inputted from the input unit attached to the terminal unit, and the file relocating program 9 may be started by transferring a user's request to the host side to execute a file relocation corresponding to the request.

FIG. 16 is a flowchart for explaining the operation of the interactive processing control program provided in the work station shown in FIG. 15, and FIGS. 17-19 a menu list and lists of storage units displayed on the screen of the terminal unit.

Figure 17:
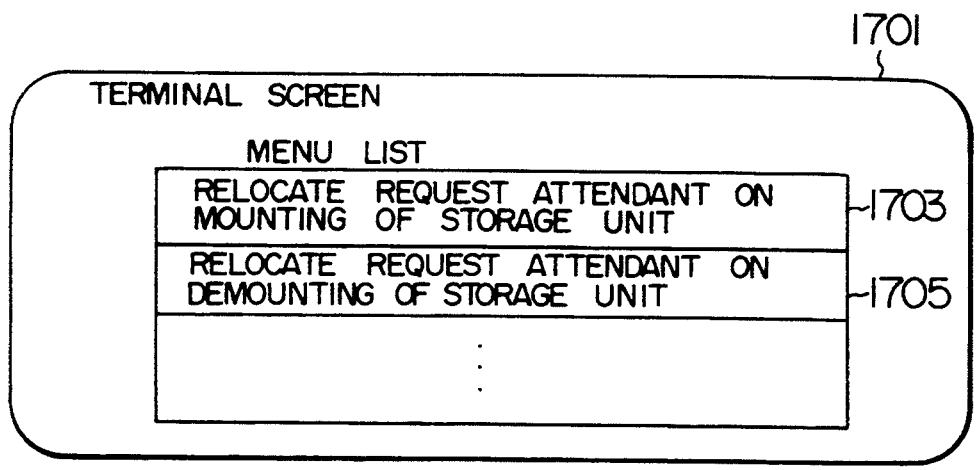
FIG. 17 is a diagram illustrating a menu list displayed on a screen of a terminal.

The interactive processing control program 1505, when started, displays a menu list for a user to select a request on the screen, as shown in FIG. 16 (step 1601), and waits for a request inputted by the user (step 1603). As shown in FIG. 17, the menu list is supposed to include at least a file relocate request 1705 attendant on mounting of a storage unit. Upon receiving a request inputted by the user, it is determined whether or not the inputted request is a request for relocating files attendant on mounting of a storage unit (step 1605).

If it is a file relocate request, at least one or more figures representing pools respectively including storage units and a list of storage unit names are displayed on the screen of the display unit 1509 (step 1607), and then an input from the user is awaited (step 1609). On the display unit 1509, FIGS. 1803A and 1803B representing pools and FIGS. 1805A and 1805B representing storage units belonging thereto, for example, are displayed as shown in FIG. 18.

The pools and the storage unit names are information previously defined by the user. These are inputted from the input unit connected to the host computer and stored. For example, the pool name 17A and the storage unit name 17B stored in the main storage unit 7 shown in FIG. 1A correspond to such information. When figures representing a pool and storage units and names thereof are displayed at step 1607 of FIG. 16, the information is transferred from the host computer to the terminal unit in response to a request from the terminal unit side. As another method of inputting and registering define information, a procedure may be employed where the define information is inputted from the input unit connected to the terminal unit, transferred to the host computer and stored in a storage unit connected to the host computer. Also, the terminal unit may be provided with a memory for storing inputted define information.

A method of transferring the define information between the host computer and the terminal unit is not so important for the present invention, so that detailed explanation thereof will be omitted.

Turning back to FIG. 16, the interactive processing control program detects that the figures, for example, 1803A and 1805A respectively representing a storage unit and a pool on the display unit have been overlapped with each other by a manipulation of the user using the input unit 1511 (step 1611), and informs the file allocating program 8 of the host computer that the user's request has been issued to relocate files attendant on mounting of a storage unit in a pool (step 1613), then terminating the processing.

Incidentally, a list including symbols and names for identifying pools and storage units may only be displayed without figures representing pools and storage units at step 1607, in a manner that the interactive processing control program may detect a designated storage unit in the list or a newly mounted storage unit at step 1611.

Figure 19:
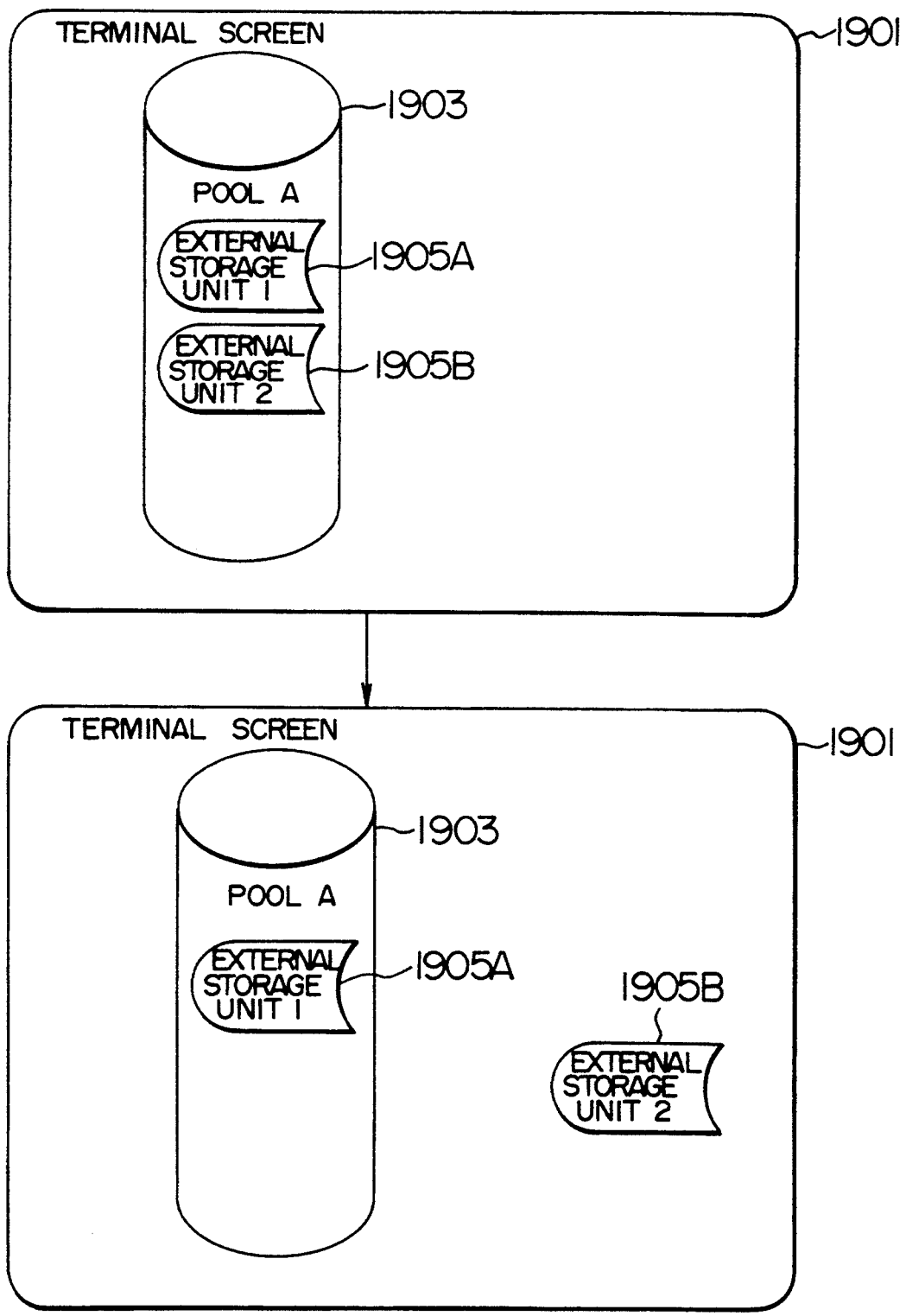
FIG. 19 is a diagram illustrating figures representing a pool and storage units displayed on a screen of a terminal for demounting a storage from the pool.

At step 1605 shown in FIG. 16, if the user's request is not a request for a file relocation attendant on mounting of a storage unit, it is next determined whether or not the user's request is a file relocate request attendant on demounting of a storage unit (step 1615). If it is a relocate request attendant on demounting, a figure 1903 representing a pool and figures 1905A and 1905B representing storage units are displayed on the screen 1901 as shown in FIG. 19 (step 1617).

Next, the interactive processing control program detects that the figures, for example, 1903A and 1905A respectively representing a storage unit and a pool on the display unit have been separated from each other by a manipulation of the user using the input unit 1511 (step 1621), and informs the file allocating program 8 of the host computer that the user's request has been issued to relocate files attendant on demounting of a storage unit from a pool (step 1623), then terminating the processing.

Incidentally, a list including symbols and names for identifying pools and storage units may only be displayed without figures representing pools and storage units at step 1617, in a manner that the interactive processing control program may detect that at least one storage unit in the list is designated or demounted at step 1621.

Figure 20:
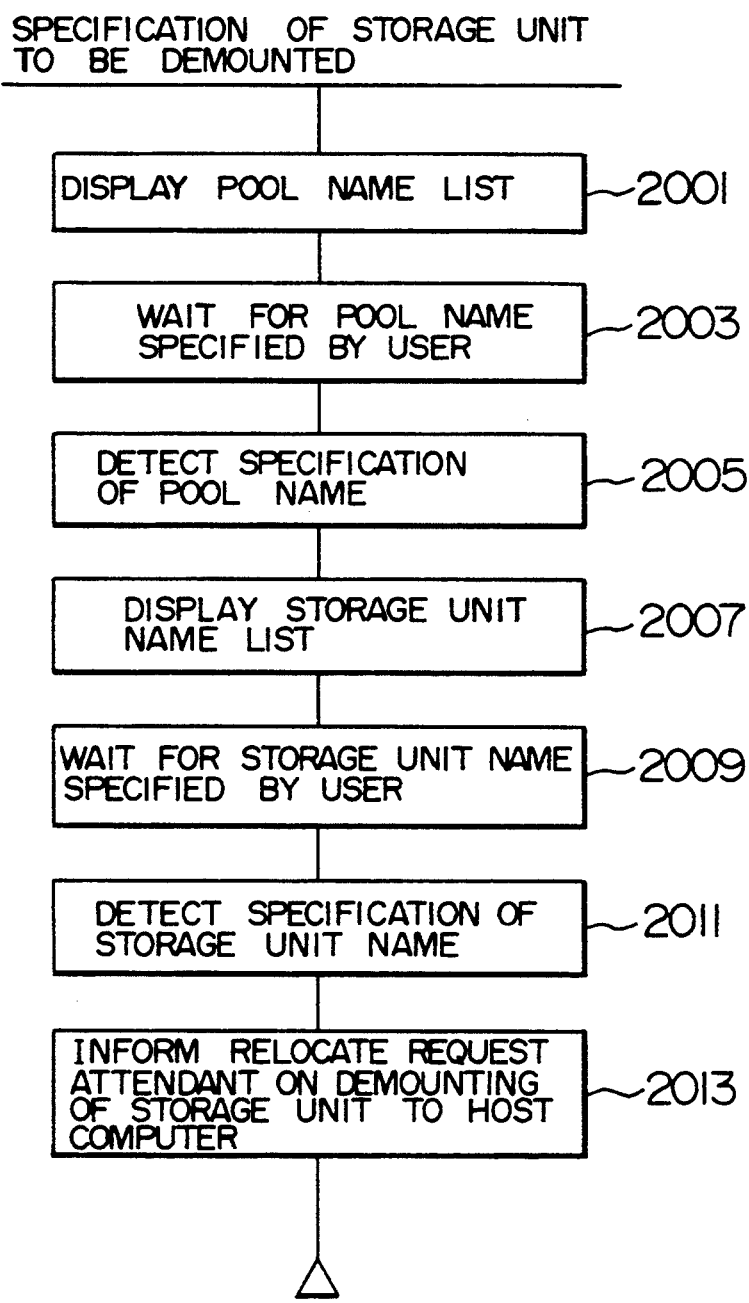
FIG. 20 is a flowchart used for explaining another example of the processing for demounting a storage unit from a pool.
Figure 21:
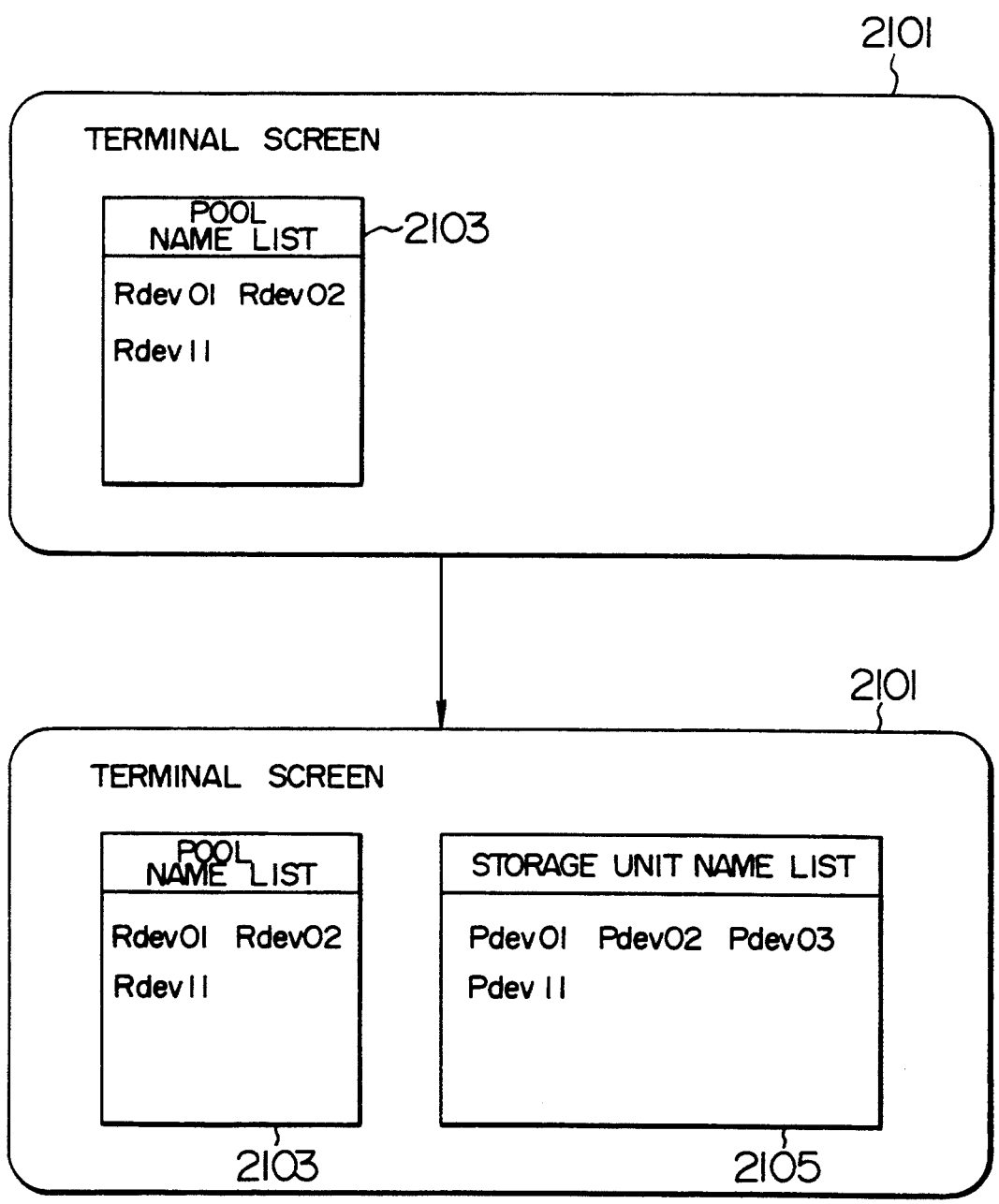
FIG. 21 is a diagram illustrating lists of pools and storage units displayed on a screen of a terminal for demounting a storage unit from a pool.

FIG. 20 is a flowchart showing another processing relative to demounting of a storage unit from a pool in FIG. 15, and FIG. 21 diagrams illustrating examples of lists of pools and storage units displayed on the screen of the terminal unit by the processing of FIG. 20.

In place of the processing from step 1617 to step 1623 of FIG. 16, an objective pool name designated by the user may be awaited (step 2003) after a list of pool names has been displayed (step 2001), as shown in FIG. 20.

On a screen 2101 of the display unit 1509 a list 2103 of pool names, for example as shown in FIG. 21, is displayed. Next, it is detected that at least one pool name displayed on the screen has been specified by the user through the input unit 1511 (step 2005), a list of names of storage units constituting the pool is displayed (step 2007), and then specification or deletion of the name of a storage unit to be demounted, performed by the user, is awaited (step 2009).

A list 2105 of storage unit names is displayed on the screen 2101 of the terminal display unit 1509, for example, as shown in FIG. 21. A list of pool names and a list of storage unit names may be displayed on a single window (a multi-window screen) or on two separate windows.

Next, upon detecting that at least one of the names of storage units belonging to the pool displayed on the terminal screen is specified or deleted by a manipulation of a user through the input unit 1511 (step 2011), the file allocating program of the host computer is informed that a user's request has been issued to relocate files attendant on demounting of a storage unit from the pool (step 2013), and the processing is terminated.

As described above, while a conventional file allocating method, which has the user specify a physical storage unit, requires a selection made by a user for selecting files and relocating destination storage units for relocation as well as a transfer of the selected files each time the system configuration is modified due to mounting and demounting of storage units or the like, the present embodiment, in response to user's instructions for mounting and demounting of a storage unit in and from a logical storage unit group, automatically relocates files stored in the physical storage unit group, thereby simplifying a transfer of files attendant on a modification in the system configuration.

The respective embodiments so far described produces the following effects:

(i) Mounting of a new storage unit in a storage unit group, demounting of a storage unit from a storage unit group, mounting of a file in a storage unit group, and transfer of allocated files to other storage units caused by a used time zone of files are all automatically carried out, thereby alleviating transfer operations, eliminating erroneous operations possibly made by an operator, preventing destruction of files, efficiently utilizing storage units, and improving the file access capability.

(ii) When an expecting processing time for a computer system to complete a work operation, that is, an expecting execution time for a job or a job net is specified by a user, file groups are automatically relocated among storage units having different access capabilities so as to satisfy the user's expectation, thereby making it possible to utilize the storage units conforming to user's expectation.

(iii) Access loads among storage units having the identical access capability are balanced to prevent an execution waiting condition due to concentration of accesses to a particular storage unit, thereby improving the utilizing degree of storage units.

(iv) When a relocation allowable time is specified, files are automatically relocated among storage units having different access capabilities within the specified allowable time so as to minimize an expecting execution time of each job or job net or minimize unbalanced access loads, thereby preventing a time required for the relocation from improperly being prolonged.

(v) Files allocated in a storage unit group and being used are excluded from objective files to be relocated, so that a relocation can be carried out without affecting a job presently under execution.

(vi) When an access busy ratio to a storage unit exceeds a predetermined value due to a relocation, a message is outputted for recommending extension of a storage unit, thereby facilitating the user to know capability limits of an existing system configuration and accordingly manage storage units.

(vii) A file relocating method is provided which classifies objective files into those which require transfer of management information and data thereof, those, management information of which is to be relocated and data of which may be deleted, and those for which a region for storing data thereof is reserved, management information of which is to be relocated and data of which may be deleted, thereby reducing a time required for the relocation.

(viii) Symbols representing storage unit groups and storage units constituting the groups are displayed on a terminal screen, and overlap and separation of the symbols are detected to relocate files allocated in a storage unit group specified by the display manipulation, thereby providing a user friendly operating method.

What is claimed is:

1. In a computer system including storage units arranged in a storage hierarchy structure, a method of relocating a file stored in a source storage unit, said method being executed by a computer, comprising the steps of:

generating a relocate instruction, upon executing at least a job, in accordance with a difference between an expected execution time preset for the job and an actual execution time of the job in response to a user's relocate request;

determining an access indicator indicative of efficiency of access to the file in accordance with said relocate instruction;

determining a destination storage unit in the storage hierarchy structure to which the file is to be relocated in accordance with the determined access indicator; and relocating the file to the determined destination storage unit.

2. The method according to claim 1, further comprising the step of generating the relocate instruction in response to an instruction indicative of a modification of a storage unit configuration when a system generation program is executed for specifying a system configuration of a computer system.

3. The method according to claim 1, wherein a plurality of storage units are grouped in a plurality of pools, and the method further comprises the step of generating the relocate instruction in response to an instruction representing a modification of a pool configuration when a pool configuration define program is executed for defining pools.

4. The method according to claim 1, wherein said step of determining a destination storage unit comprises the steps of:

determining a destination layer of the file in the storage hierarchy structure in accordance with the determined access indicator; and determining the destination storage unit so as to make equal, as much as possible, access frequencies among storage units in the determined destination layer.

5. The method according to claim 1, wherein said determining a destination storage unit step includes the step of determining whether data contained in the file actually needs to be transferred, and said relocating step includes the step of, when it is determined that the data contained in the file actually need not be transferred, transferring management information of the file and selectively reserving a region for the file in the destination storage unit, in accordance with attributes of the file.

6. In a computer system including storage units which are grouped, a method of relocating a file, said method being executed by a computer, comprising the steps of:

storing an identifier for specifying at least one storage unit including a source storage unit belonging to a group;

displaying on a screen the identifier, a figure representing the group, a figure representing an objective storage unit, and an identifier for specifying the objective storage unit;

generating a relocate request in response to a manipulation for overlapping the figure representing the objective storage unit separate with the figure representing the group or a manipulation for separating the figure representing the objective storage unit from the figure representing the group;

generating a relocation instruction, upon executing at least a job, in accordance with a difference between an expected execution time preset for the job and an actual execution time of the job in response to said relocate request;

determining a destination storage unit for files stored in the source storage unit in the group in accordance with the relocation instruction; and relocating the files in the determined destination storage unit.

7. The method according to claim 6, wherein said step of determining a destination storage unit comprises the step of determining the destination storage unit for the files belonging to the group in accordance with an access indicator indicative of efficiency of access to the file.

8. The method according to claim 6, wherein said step of determining a destination storage unit includes the step of determining whether the file can be relocated to the destination storage unit.

9. The method according to claim 8, wherein said determining step comprises the step of determining whether the relocation is possible in accordance with a busy ratio of the destination storage unit expected when the file is relocated to the destination storage unit.

10. The method according to claim 8, further comprising the step of generating a message for recommending extension of a storage unit when it is determined at said determining step that the file cannot be relocated.

11. The method according to claim 8, wherein said determining step includes the step of determining whether the relocation can be completed within an allowable time.

12. The method according to claim 8, wherein said determining step includes the step of determining whether data contained in the file actually need be transferred, and said relocating step includes the step of, when it is determined that the data contained in the file actually need not be transferred, transferring management information of the file and selectively reserving a region for the file in the destination storage unit in accordance with attributes of the file.

13. The method according to claim 8, wherein said determining step includes the step of determining whether data contained in the file actually need be transferred, and said relocating step includes the step of, when it is determined that the data contained in the file actually need not be transferred, transferring management information of the file and selectively reserving a region for the file in a destination storage unit in accordance with attributes of the file.

14. A computer system comprising:

a plurality of storage units in a storage hierarchy, a file being stored in a source storage unit;

generating means for generating a relocation instruction, upon executing at least a job, in accordance with a difference between an expected execution time preset for the job and an actual execution time of the job in response to a user's relocate request;

access indicator determining means for determining an access indicator indicative of efficiency of access to the file in accordance with said relocation instruction;

relocating destination determining means for determining a destination storage unit in the plurality of storage units as a relocating destination of the file in accordance with the determined access indicator; and a relocating means for relocating the file to the determined destination storage unit.

15. A computer system comprising:
a plurality of storage units respectively having an identifier and collected as groups, each of the groups including one or more storage units;
display means for displaying a figure representing a particular group, identifiers of one or more storage units in the particular group, a figure representing an objective storage unit, and an identifier for specifying the objective storage unit;
position moving means for moving a position at which the figure representing the objective storage unit is displayed;
instruction generating means for generating a relocation request in response to a manipulation for overlapping the figure representing the objective storage unit with the figure representing the particular group or a manipulation for separating the figure representing the objective storage unit from the figure representing the particular group;
generating means for generating a relocation instruction, upon executing at least a job, in accordance with a difference between an expected execution time preset for the job and an actual execution time of the job in response to said relocate request;
means for determining a destination storage unit as a relocating destination of files stored in a source storage unit belonging to the particular group in accordance with the relocation instruction; and
relocating means for relocating the files in the determined destination storage unit.

16. In a computer system including storage units arranged in a storage hierarchy structure, a method of relocating a file stored in a source storage unit, said method being executed by a computer, comprising the steps of:
generating a relocation instruction, upon executing at least a job, in accordance with a difference between an expected execution time preset for the job and an actual execution time of the job in response to a user's relocate request;
determining an access indicator indicative of efficiency of access to the file in accordance with said relocation instruction;
determining a destination storage unit in the storage hierarchy structure to which the file is to be relocated in accordance with the determined access indicator, determining whether the file can be relocated in the destination storage unit, and determining whether the relocation can be completed within an allowable time designated by the user; and
relocating the file to the determined destination storage unit.

17. In a computer system including storage units arranged in a storage hierarchy structure, a method of relocating a file stored in a source storage unit, said method being executed by a computer, comprising the steps of:
generating a relocation instruction in response to an instruction indicative of a modification of a storage unit configuration of said storage hierarchy structure when a system generation program is executed for specifying a system configuration of a computer system;
when a plurality of storage units are grouped in a plurality of pools, generating the relocation instruction in response to an instruction representing a modification of a pool configuration when a pool configuration define program is executed by said computer for defining pools;
determining an access indicator indicative of efficiency of access to the file in accordance with said relocate instruction;
determining a destination storage unit in the storage hierarchy structure to which the file is to be relocated in accordance with the determined access indicator; and
relocating the file to the determined destination storage unit.

18. In a computer system including storage units arranged in a storage hierarchy structure, a method of relocating a file stored in a source storage unit, said method being executed by a computer, comprising the steps of:
generating a relocation instruction, upon executing at least a job, in accordance with a difference between an expected execution time preset for the job and an actual execution time of the job in response to a user's relocate request;
determining an access indicator indicative of efficiency of access to the file in accordance with said relocation instruction;
determining a destination storage unit in the storage hierarchy structure to which the file is to be relocated in accordance with the determined access indicator;
determining whether data contained in the file actually needs to be transferred;
when it is determined that the data contained in the file actually needs to be transferred, relocating the file to the determined destination storage unit; and
when it is determined that the data contained in the file actually need not be transferred, transferring management information of the file and selectively reserving a region for the file in the destination storage unit, in accordance with attributes of the file.

* * * * *